United States Patent [19]

Garcia et al.

[11] Patent Number: 4,918,627
[45] Date of Patent: Apr. 17, 1990

[54] COMPUTER INTEGRATED GAGING SYSTEM

[75] Inventors: Christopher J. Garcia, Morgan Hill; Leslie O. Lincoln, Sunnyvale; Keith A. Johnson, San Jose, all of Calif.

[73] Assignee: FMC Corporation, Chicago, Ill.

[21] Appl. No.: 58,687

[22] Filed: Jun. 3, 1987

Related U.S. Application Data

[63] Continuation-in-part of Ser. No. 892,616, Aug. 4, 1986, abandoned.

[51] Int. Cl.[4] .............................................. G06F 15/40
[52] U.S. Cl. .............................. 364/552; 364/551.02; 364/474.17; 364/474.24; 364/474.26; 364/578; 364/560; 382/8; 358/101
[58] Field of Search ............... 364/468, 474, 507, 550, 364/551, 552, 560, 578, 579, 138, 188, 551.02, 474.17, 474.22, 474.24, 474.26; 209/546, 538; 358/101; 382/1, 8; 340/712, 747, 734, 735, 722

[56] References Cited

U.S. PATENT DOCUMENTS

| | | | |
|---|---|---|---|
| 3,641,326 | 2/1972 | Harte | 364/171 X |
| 4,344,146 | 8/1982 | Davis, Jr. et al. | 364/552 |
| 4,399,554 | 8/1983 | Perkins, III et al. | 358/101 X |
| 4,414,566 | 11/1983 | Peyton et al. | 358/101 |
| 4,481,664 | 11/1984 | Linger et al. | 358/107 X |
| 4,587,617 | 5/1986 | Barker et al. | 364/507 |
| 4,589,139 | 5/1986 | Hada et al. | 382/8 |
| 4,611,292 | 9/1986 | Ninomiya et al. | 364/559 |
| 4,628,434 | 12/1986 | Tashiro et al. | 364/140 X |
| 4,628,531 | 12/1986 | Okamoto et al. | 382/8 |
| 4,649,503 | 3/1987 | Keller | 364/552 |
| 4,665,492 | 5/1987 | Masters | 364/468 |
| 4,679,159 | 7/1987 | Yamazaki et al. | 364/560 |
| 4,697,240 | 9/1987 | Cedar et al. | 364/474 |
| 4,697,245 | 9/1987 | Kara et al. | 364/552 |
| 4,698,629 | 10/1987 | Mori et al. | 364/474 |
| 4,698,766 | 10/1987 | Entwistle et al. | 364/474 X |
| 4,716,516 | 12/1987 | DuLong | 364/474 X |
| 4,723,203 | 2/1988 | Kishi et al. | 364/474.26 |
| 4,739,488 | 4/1988 | Asakura | 364/474 |
| 4,740,902 | 4/1988 | Yoneda et al. | 364/474 |
| 4,791,579 | 12/1988 | Kranitzky | 364/474.24 X |

FOREIGN PATENT DOCUMENTS

| | | |
|---|---|---|
| 0132947 | 2/1985 | European Pat. Off. |
| 2155661 | 12/1986 | European Pat. Off. |
| 0199961 | 9/1985 | United Kingdom |

OTHER PUBLICATIONS

Pruitt, G., "Graphical Inspection Analysis", *Practical Design and Application*, published by Soc.'y of Manuf. Eng., 1983, pp. 238–303.
Williams et al., "Gauging for Position—A Computer Simulation", *Australian Conference on Manufacturing Engineering*, 1977, pp. 149–153.

Primary Examiner—Parshotam S. Lall
Assistant Examiner—Joseph L. Dixon
Attorney, Agent, or Firm—Henry M. Stanley; Ronald C. Kamp; R. B. Megley

[57] ABSTRACT

A system is provided which operates to compare three-dimensional models of inspection gages constructed from computer aided design (CAD) data for a manufactured part and standard geometric dimension and tolerance call-outs to three-dimensional models constructed from inspection data obtained from the manufactured part. The comparison is made both graphically, to assist an operator, and mathematically to determine part condition. Parts are found to be either in tolerance or out of tolerance. If out of tolerance they are found to be either reworkable or scrap. Additionally, the system is capable of determining syntax correctness for tolerance standards, defining the sequence of steps for a specific job prior to job execution, performing individual part tolerance conformance analyses and statistical part tolerance analyses for a population of parts, tolerance analyses for mating parts, and generation of tolerance call-outs for fixed and floating fastener features on parts.

73 Claims, 12 Drawing Sheets

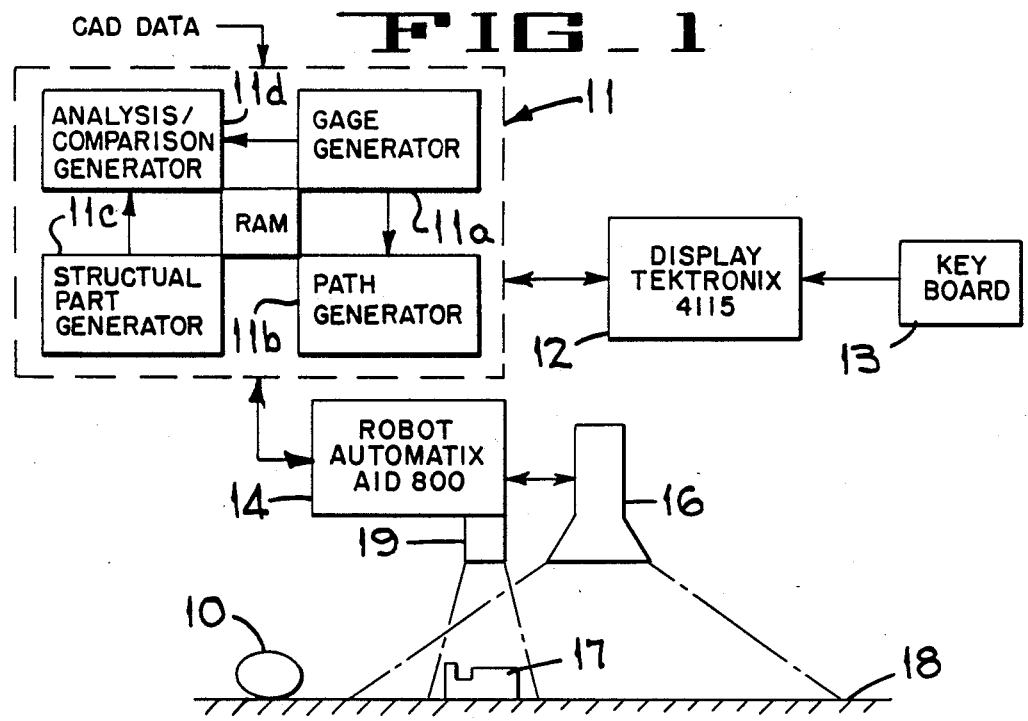

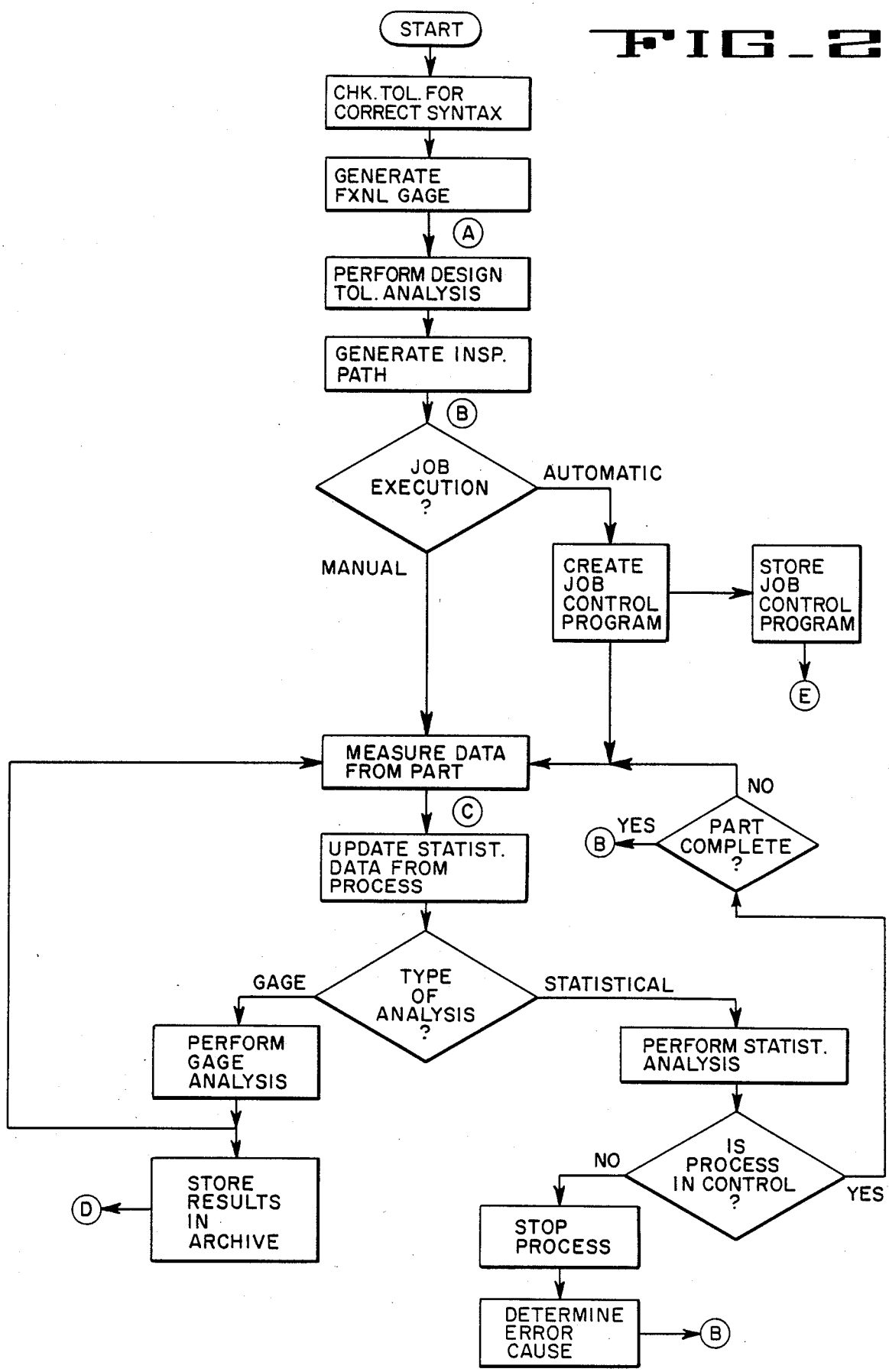

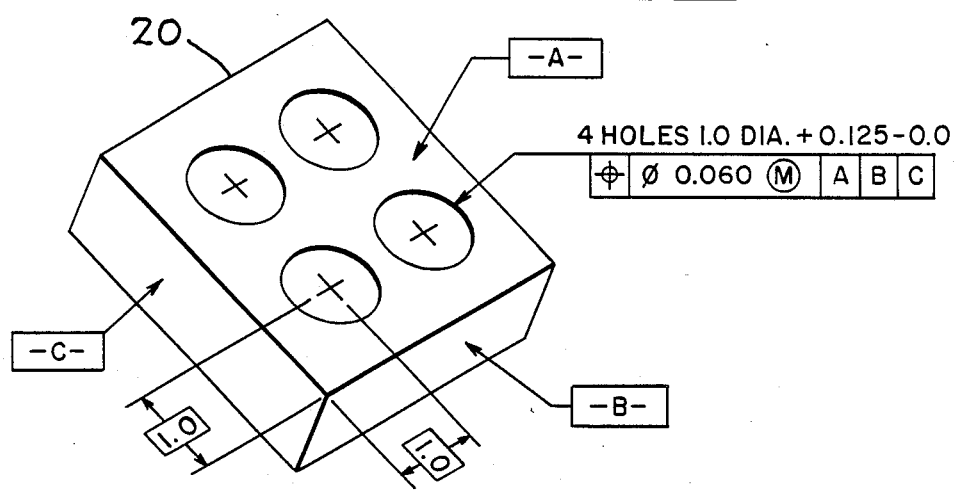
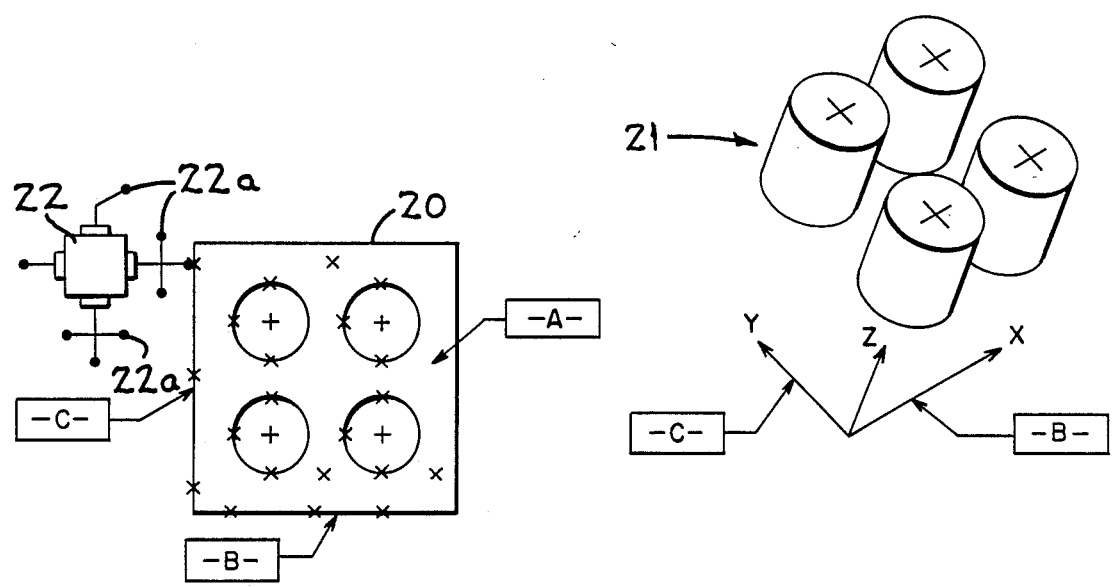
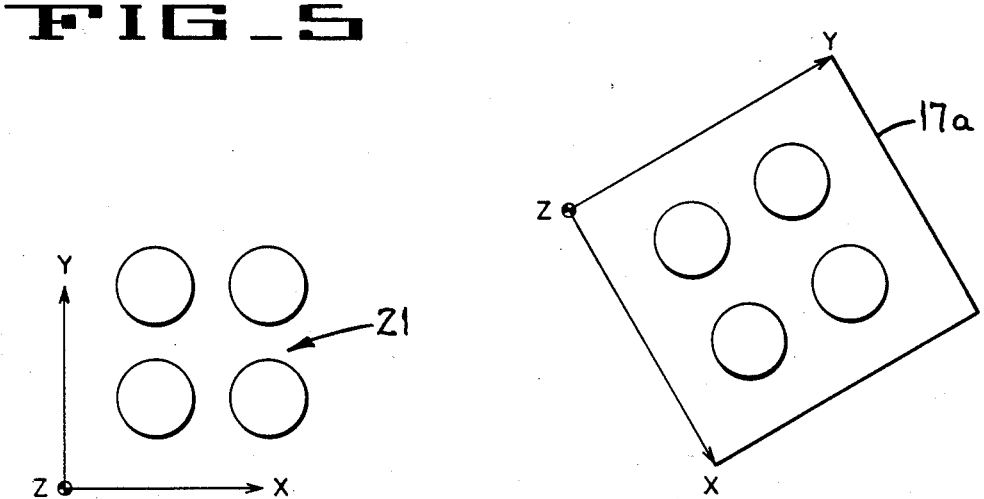

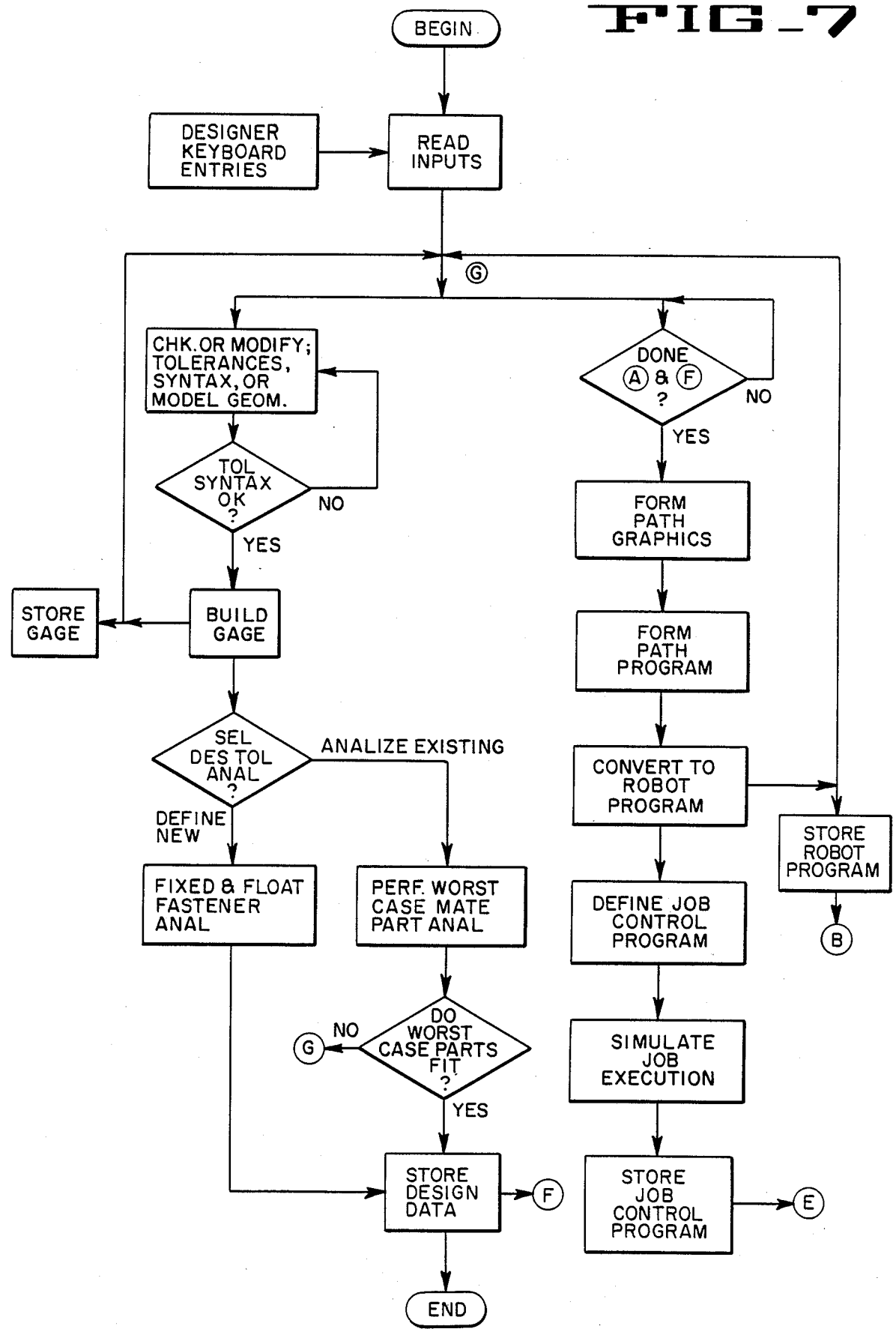

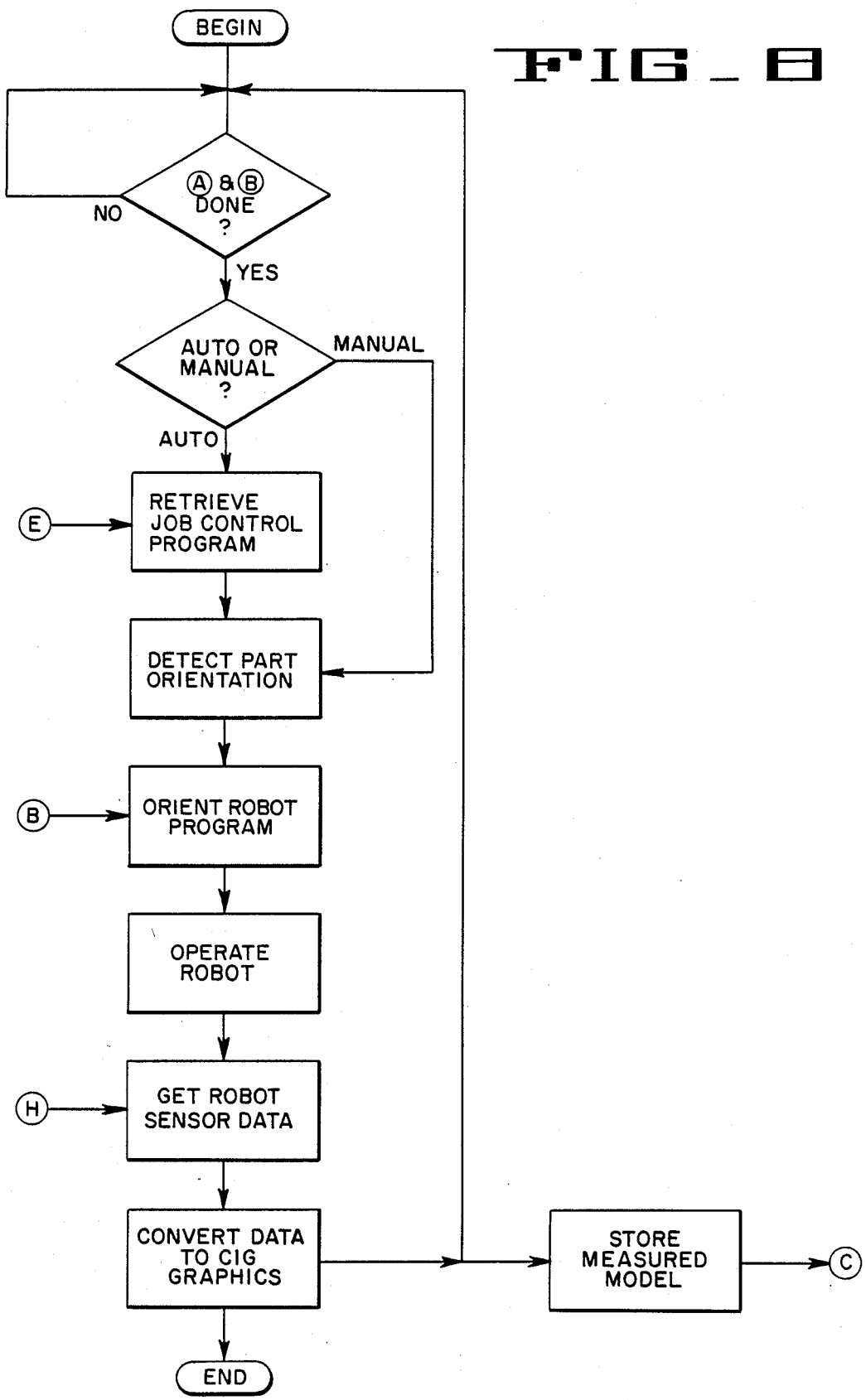
FIG_8

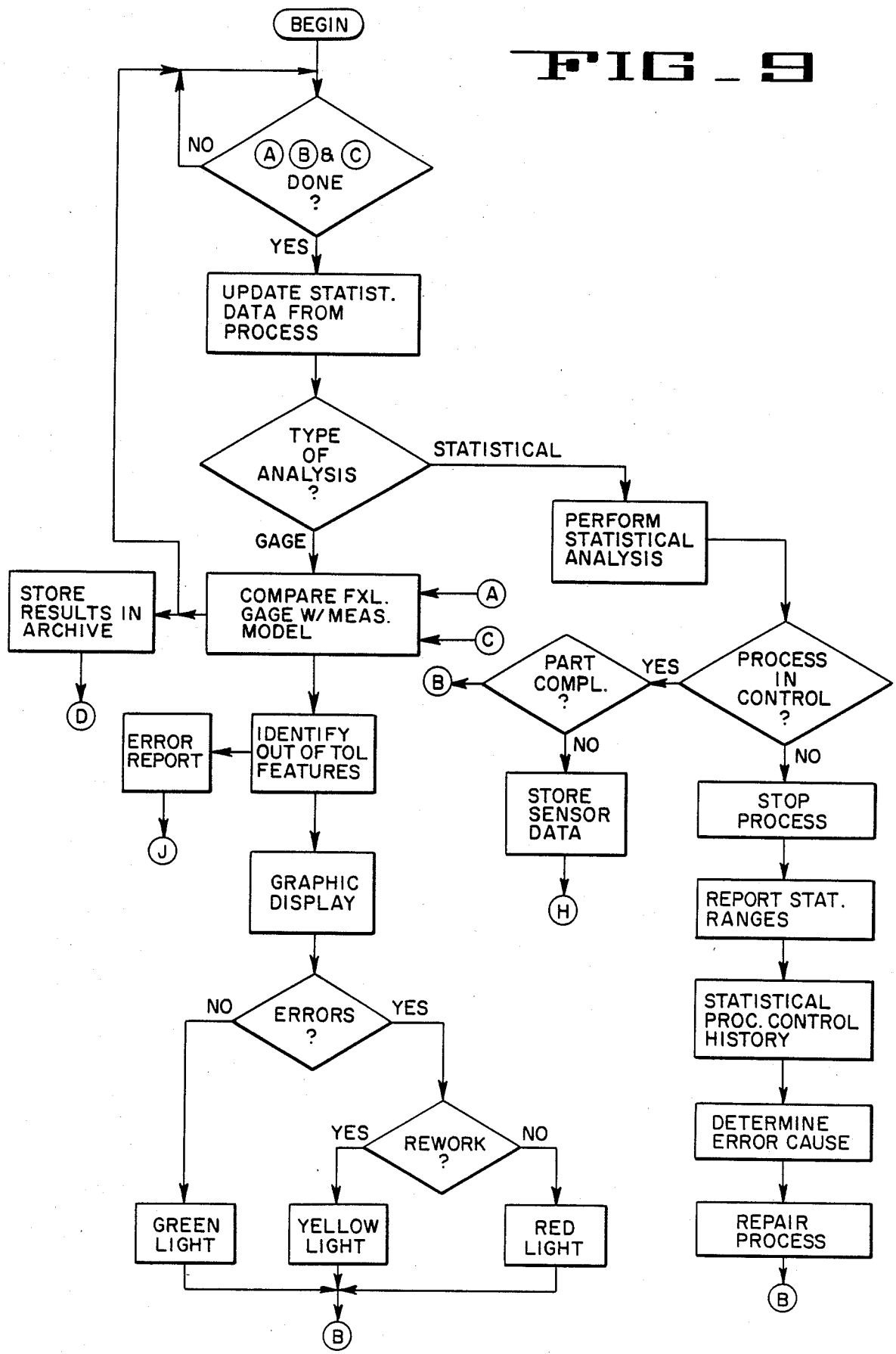
FIG_9

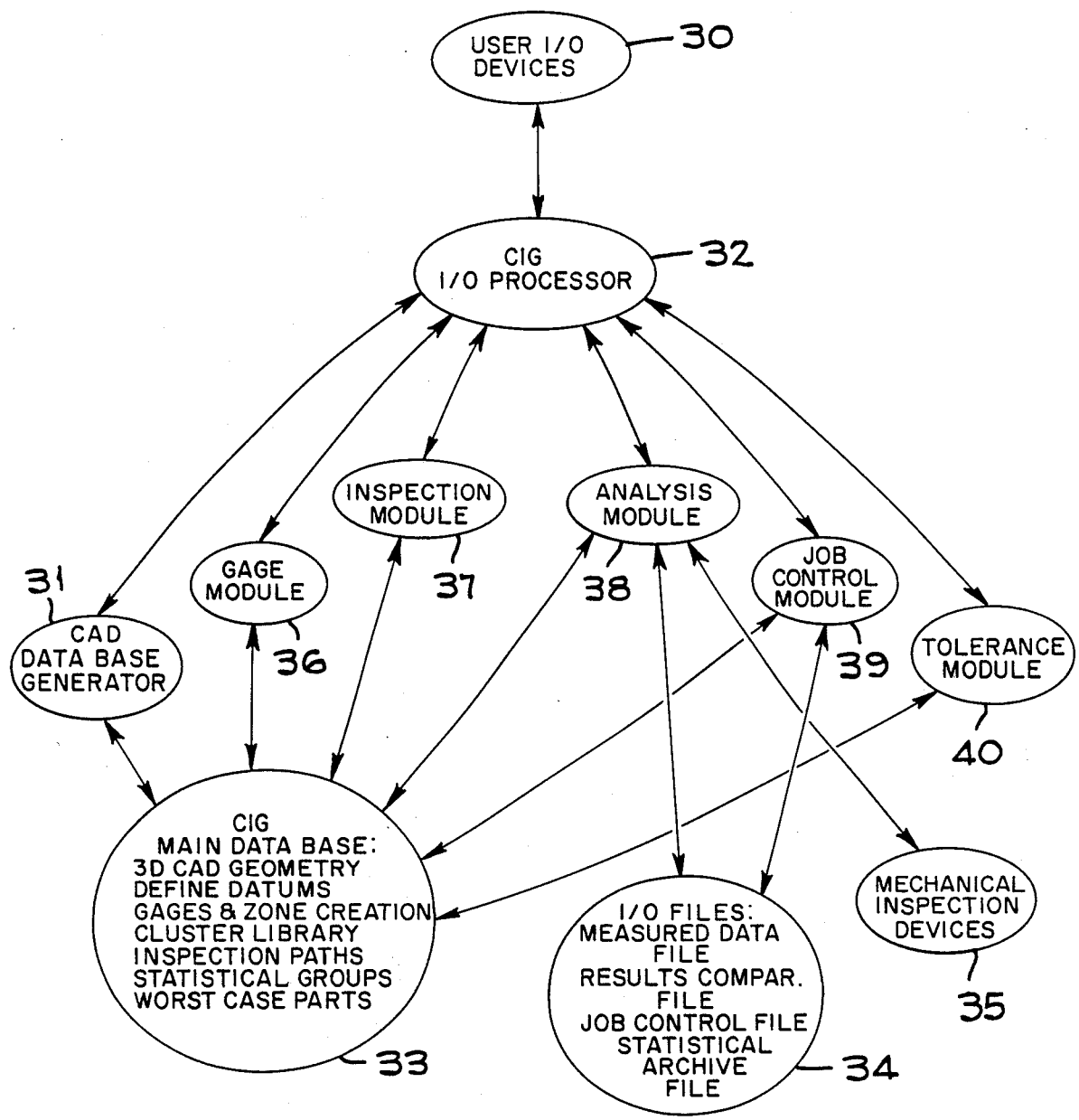
FIG_10

FIG_11

| | TYPE OF TOLERANCE | CHARACTERISTIC | SYMBOL |
|---|---|---|---|
| FOR INDIVIDUAL FEATURES | FORM | STRAIGHTNESS | — |
| | | FLATNESS | ⌗ |
| | | CIRCULARITY (ROUNDNESS) | ○ |
| | | CYLINDRICITY | ⌭ |
| FOR INDIVIDUAL OR RELATED FEATURES | PROFILE | PROFILE OF A LINE | ⌒ |
| | | PROFILE OF A SURFACE | ⌓ |
| FOR RELATED FEATURES | ORIENTATION | ANGULARITY | ∠ |
| | | PERPENDICULARITY | ⊥ |
| | | PARALLELISM | // |
| | LOCATION | POSITION | ⊕ |
| | | CONCENTRICITY | ◎ |
| | RUNOUT | CIRCULAR RUNOUT | ↗ |
| | | TOTAL RUNOUT | ↗↗ |

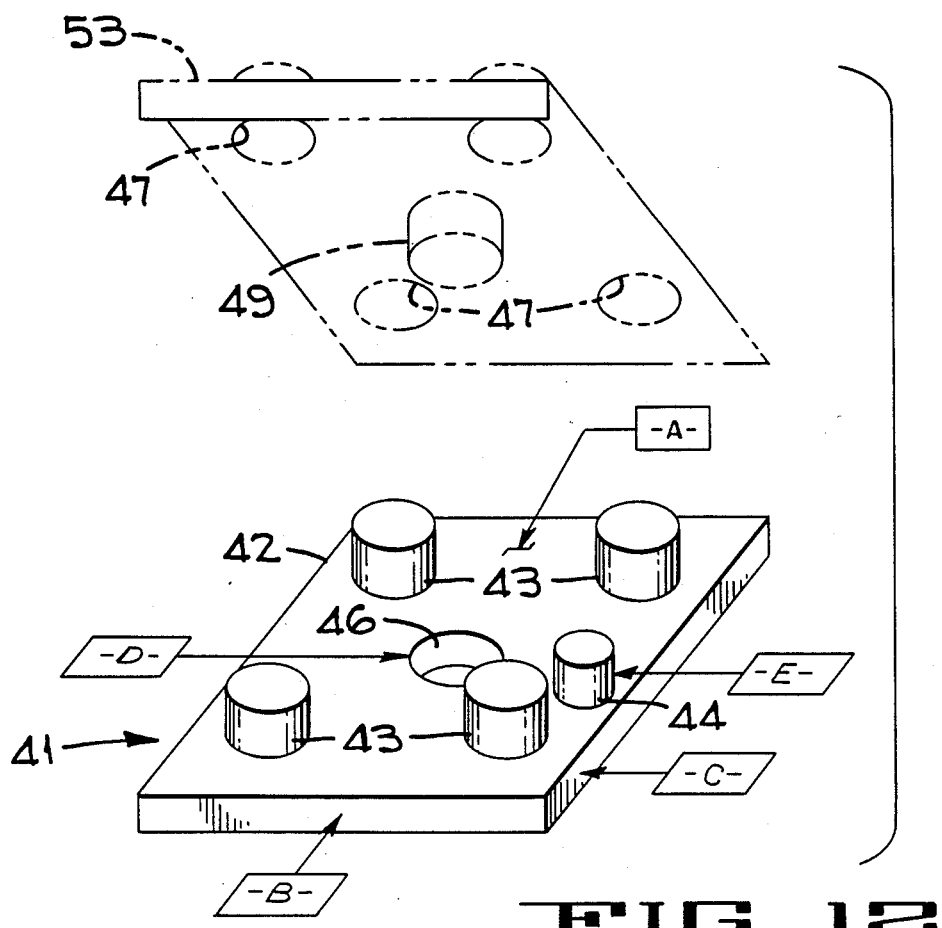

FIG_12

FIG_13A

FIG_13B
| PRIMARY DATUM: HOLE/BOSS AT MMC TER. DAT. SECONDARY DATUM | NONE a | PLANE b | HOLE/BOSS AT MMC c | HOLE/BOSS AT RFS d |
|---|---|---|---|---|
| NONE | e 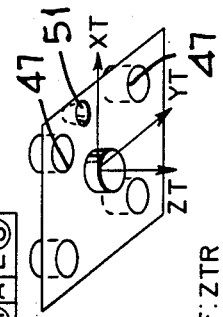 D Ⓜ 3DF:XTT,YTT,ZTR | | 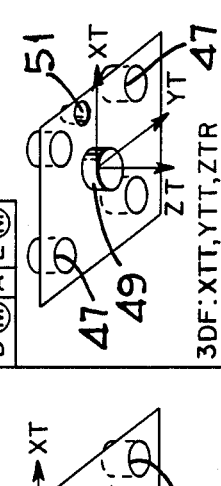 D Ⓜ A E Ⓜ 3DF:XTT,YTT,ZTR | 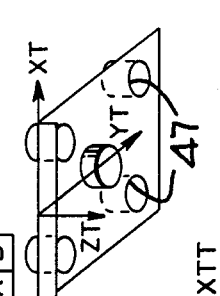 D Ⓜ A E Ⓢ 1DF:ZTR |
| PLANE | f D Ⓜ A 3DF:XTT,YTT,ZTR | D Ⓜ A B 1DF:XTT | | |
| HOLE/BOSS AT MMC | g D Ⓜ E Ⓜ 3DF:XTT,YTT,ZTR | D Ⓜ E Ⓜ A 1DF:XTT | | |
| HOLE/BOSS AT RFS | h 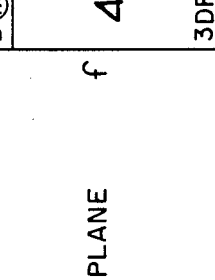 D Ⓜ E Ⓢ 1DF:ZTR | 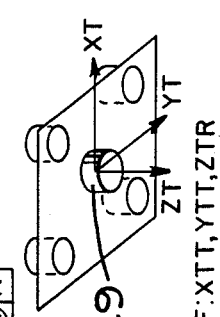 D Ⓜ E Ⓢ A 1DF:ZTR | | |

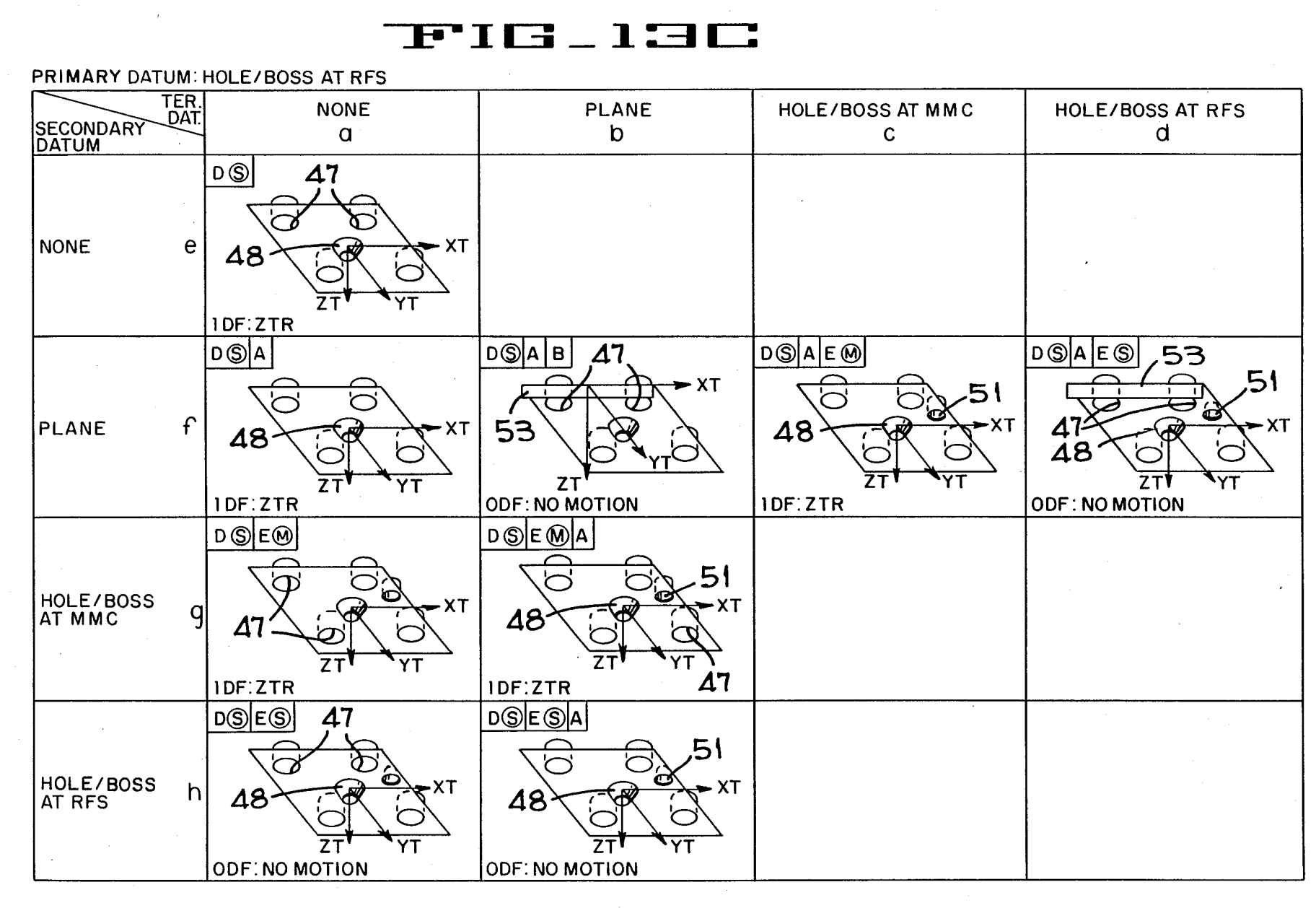

FIG_13C

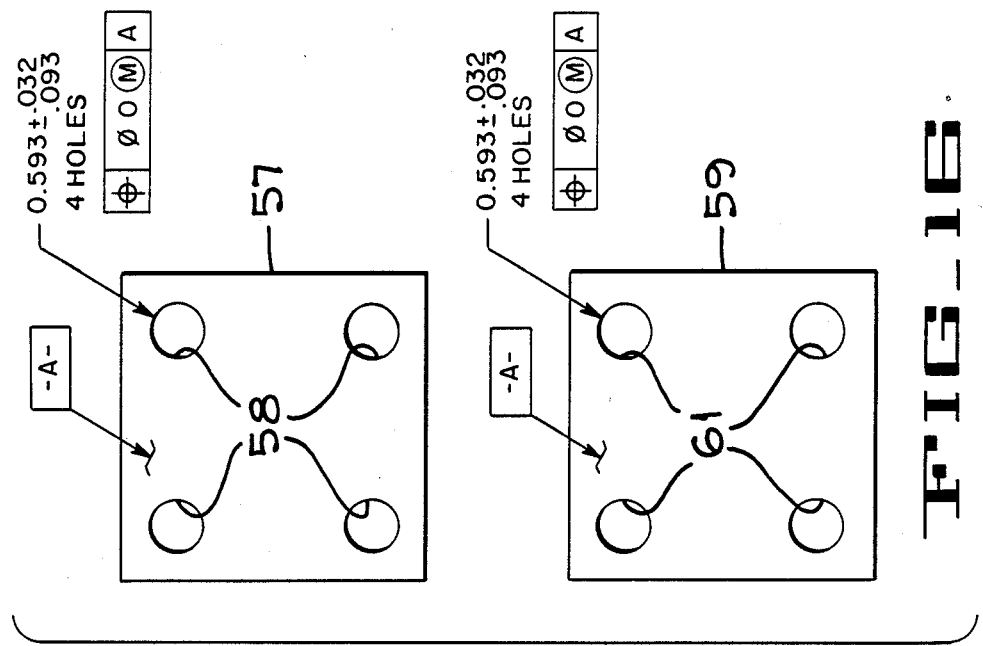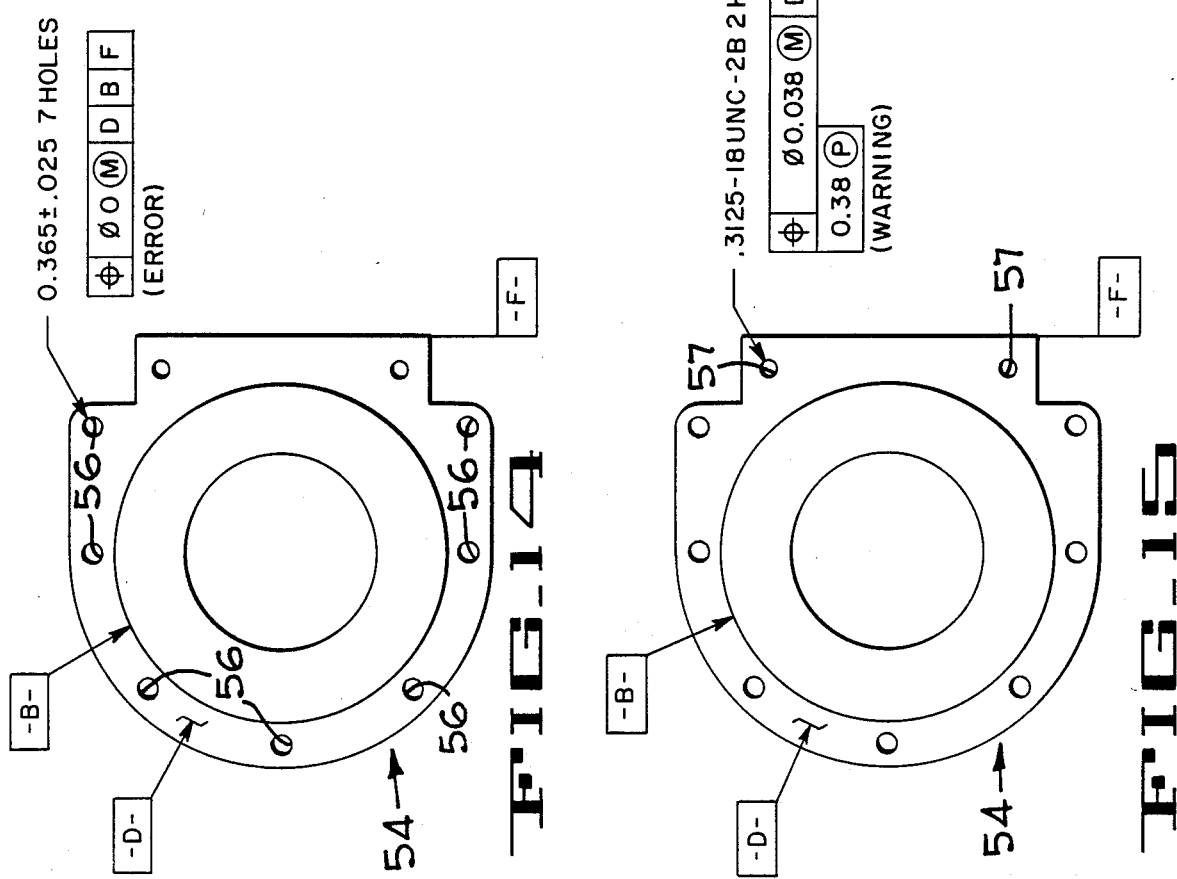

COMPUTER INTEGRATED GAGING SYSTEM

CROSS-REFERENCE TO RELATED APPLICATION

The present application is a continuation-in-part of our prior application Ser. No. 06/892,616, filed Aug. 4, 1986, now abandoned.

BACKGROUND OF THE INVENTION

The invention disclosed herein relates to an inspection tool for mechanical parts and more particularly, to such a tool which utilizes part design data to construct an inspection gage and inspection data to construct a model of the inspected part for comparison with the gage.

SUMMARY OF THE INVENTION

The invention includes a method of inspecting a fabricated structural part to determine conformance to known part dimensional feature and tolerance call-outs using a computer coupled to a multi-dimensionally movable position measuring apparatus. The method includes the steps of constructing a multi-dimensional model of an inspection gage using the known dimensional feature and tolerance call-outs of the part. An inspection path is generated relative to the part which defines the movement of the position measuring apparatus for inspecting the part. The position measuring apparatus is then moved along the inspection path and the positions of the dimensional features on the part are determined. A multi-dimensional model of the structural part is made using the determined positions of the part dimensional features. The inspection gage model is compared with the structural part model and it is thereby determined if the part is within or out of tolerance.

The apparatus of the invention serves to compare a three dimensional model of an inspection gage to a three dimensional model of a manufactured part using computer aided design data for the part. A computer receives the part design data and a display is coupled to the computer for displaying models of the designed part, the inspection gage and the manufactured part. A keyboard is also coupled to the computer for selecting particular part dimensional and tolerance call-outs on the designed part model display from which selections the inspection gage model is obtained. A movable member is attached to means provided for moving the member in three space dimensions. The moving means is coupled to the computer so that an inspection path may be followed by the member around the manufactured part. A position sensor is attached to the moving member, also coupled to the computer, so that the positions of the features of the part being inspected may be detected and the manufactured part model constructed therefrom. The inspection gage and manufactured part models are compared visually on the display and mathematically by the computer to determine in and out of tolerance manufactured part conditions.

The invention further includes a method of inspecting a manufactured structural part to determine conformance to known dimensional features and tolerance call-outs using a computer coupled to a multi-dimensionally movable position measuring apparatus. The method includes the steps of checking the tolerance call-outs for the part for correct syntax, and constructing a multi-dimensional model of an inspection gage, if syntactic correctness is found, using the dimensional and tolerance call-outs of the part. An inspection path is generated relative to the part which defines the movement of the position measuring apparatus for inspecting the part. The position measuring apparatus is then moved along the inspection path in the process determining position data of the structural features of the part therealong, and a multi-dimensional model of the structural part is made using the data representing the determined positions of the structural features. The inspection gage model is compared with the structural part model and it is thereby determined if the part is within or out of tolerance.

In another aspect of the invention a method is provided for predetermining a job sequence to be performed on a part by a system including a computer coupled to a multi-dimensionally movable position measuring apparatus, a store coupled to the computer containing a stored CAD model of the part to be subjected to the job sequence, and a machine for performing operations on the part, the machine being adapted to be attached to and governed by the system. The method includes the steps of informing the system of the identity of the machine, connecting the machine to the system, identifying a point on the CAD model for orientation of the position measuring apparatus and the machine, designating the sequence of operations by the machine and the position measuring apparatus, analyzing data obtained from operations involving the position measuring apparatus, and disconnecting the machine.

In yet another aspect of the invention a method is presented for analyzing data relating to a physical part resulting from the operation of a system including a computer coupled to a multi-dimensionally movable position measuring apparatus, a multi-dimensionally movable machine governed by the system, and a store coupled to the computer for storing CAD data relative to the part to be subjected to the analysis as well as for receiving data relative to the physical configuration of the part. The method includes the steps of constructing data representative of an inspection gage for certain features on the part by retrieving CAD data relative to such features, measuring the corresponding physical features of the part, storing data relating to the part physical features, and determining the fit between the gage and the measured part data.

Another facet of the invention reveals a system for inspecting a structural part coupled to computer aided design data for the part including means for reading the dimensions and tolerances from the computer aided design data for the part features to be inspected, means for mathematically constructing a three-dimensional inspection gage for the part utilizing the dimensions and tolerances, means for measuring the part features to be inspected and for providing inspection data representative thereof, means for mathematically constructing a three dimensional model of the inspected part features, and means for comparing the three-dimensional model with the three-dimensional gage, whereby compliance with design data tolerances is determined.

Further, a computer controlled display system for inspection and analysis of predetermined part features on a structural part is coupled to computer aided design and tolerance data for the structural part. The system includes a display surface, means for simultaneously displaying a design data model of the structural part and an inspection path about the part model for the predetermined part features, and means for selectively altering the inspection path on the display surface.

Additionally, a computer controlled display system is disclosed for inspection and analysis of predetermined part features on a structural part coupled to computer aided design and tolerance data describing the structural part and to measuring means for the predetermined part features, which includes a display surface, and means for simultaneously displaying a model of the measured structural part features and a model of an inspection gage constructed from computer aided design and tolerance data relevant to the predetermined part features.

In addition the invention includes a method of investigating compatability of tolerance call outs on mating parts, wherein design and tolerance data for the mating parts are available in memory, including the steps of retrieving the design and tolerance data relating to the mating parts from the memory, investigating the worst case tolerance conditions for material interference between the mating parts, and indicating alternatively no interference where none exists and a location of interference where some exists.

In yet another aspect of the invention a method is disclosed of investigating compatability of tolerance call outs on mating parts wherein design and tolerance data including datums for the mating parts is available in memory. The method includes the steps of retrieving the design and tolerance data from the memory relating to the mating parts, determining if there is inconsistency in the datum call outs in the tolerance data for the mating parts, and indicating alternatively no inconsistency where none exists and the location of an inconsistency where some exists.

As another aspect of the invention a method is provided for determining tolerance call outs for fixed and floating fastener features on mating parts, wherein design data for the mating parts is available in memory, including the steps of selecting a fastener, designating the position on a part where the fastener is to be used, designating the datums on the part from which the fastener locations are to be referenced, selecting a tool for forming the part features to receive the fasteners, determining the part feature maximum and minimum sizes considering the tool and the selected fastener, and displaying the position tolerance for the fastener part features.

BRIEF DESCRIPTION OF THE DRAWINGS

FIG. 1 is a block diagram showing the component parts of the system of the present invention.

FIG. 2 is a flow diagram relating to the computer integrated gaging system of the present invention.

FIG. 3 is a perspective view of a model of a manufactured part subject to inspection by the present invention.

FIG. 4 is a perspective view of an inspection gage constructed through the use of the present invention.

FIG. 5 is a diagram showing inspection path generation as used in the present invention.

FIG. 6A is a plan view of the inspection gage of FIG. 4.

FIG. 6B is a plan view of the manufactured part of FIG. 1.

FIG. 7 is a flow diagram showing detail of initial portions of the flow diagram of FIG. 2.

FIG. 8 is a flow diagram showing detail of subsequent portions of the flow diagram of FIG. 2.

FIG. 9 is another flow diagram showing detail of the latter portions of the flow diagram of FIG. 2.

FIG. 10 is a data flow diagram of the system of the present invention.

FIG. 11 is a chart of representative ANSI standard tolerance call-out symbols.

FIG. 12 is a perspective view of a manufactured part depicting datums thereon.

FIGS. 13A-13C are charts depicting inspection gages and datums for the manufactured part of FIG. 12.

FIG. 14 is a plan view of a part with a syntactically incorrect part feature call-out.

FIG. 15 is a plan view of the part of FIG. 14 with another syntactically inappropriate part feature call-out.

FIG. 16 is a plan view of mating parts illustrating compatible part feature call-outs.

DESCRIPTION OF THE PREFERRED EMBODIMENTS

A short title for the function performed by the system disclosed herein is computer integrated gaging (CIG).

The system of the present invention may be seen with reference to FIG. 1 wherein a computer 11, such as the VAX11/780® is coupled to a display 12, such as the Textronix 4115®. Random access memory (RAM) is an integral part of the VAX11/780®. A keyboard 13 is provided for entering information into the system for use by the computer in controlling system operation. Visual reference for keyboard operation is provided at the display 12. A mechanism or robot 14 for providing three dimensional movement within a prescribed volume is exemplified by the Automatix robot designated AID 800®. A camera 16 is mounted to a known position overlying a working space and is utilized to determine the orientation of a part 17 resting on an underlying support surface 18. A sensor 19 is attached to the robot 14 and is exemplified by the non-contacting inspection (NCI) device shown in FIG. 1 as a SELCOM® laser sensor. It should be noted that the position sensing device 19 could consist of a coordinate measuring machine (CMM) or a numerically controlled machine tool adapted with a touch probe. These devices would acquire inspection data by physically contacting various mechanical features on the part 17.

With reference to FIG. 2 of the drawings the flow diagram depicted there indicates that the initial step in the process defining one embodiment of the invention involves the generation of a functional inspection gage by gage generator 11a (FIG. 1). The manner in which this is accomplished includes the transmittal of computer aided design (CAD) data for a part 17 to the computer 11 as seen in FIG. 1 and the subsequent display 20, in perspective as seen in FIG. 3, of the designed part together with dimensional and tolerancing information in accordance with geometric dimensioning and tolerancing (GD&T) standards. The standard used for illustration here is U.S. Government designation ANSI Y14.5. There are shown three surface references, A, B and C. Alternatively, the references may comprise the edge of a part, a point on a part, a hole, etc. As seen in FIG. 3, the dimensional call-out is for four holes of one inch diameter plus 0.125 minus 0.0 inches on the display or model 20 of the part 17. This dimensional and tolerance call-out is considered to be a critical and major feature for the illustrated part. The holes are indicated to be located using the method of tolerancing termed "true position" (FIG. 11) as indicated by the initial symbol in the tolerance block. Other drafting tolerancing methods may be selected such as reference to a surface profile or plus or minus tolerance dimensions. The holes in FIG. 3 are required to be positioned so that their centers, as manufactured, will vary only within a 0.06 inch diameter circle at maximum material conditions (MMC, smallest holes). If the hole is larger than the MMC size, then the tolerance circle diameter grows in proportion. The true position of each hole is referenced to the three indicated surfaces A, B and C.

The operator of the system observes the ideal design or model 20 of the part 17 on the display 12 and is able to signify to the system through the keyboard 13 any one of several tolerancing conventions which appear on a menu on the screen. In the illustration of FIG. 3, the true position tolerancing standard is indicated and a cursor which appears on the display is positioned to indicate the dimensional and tolerance call-out relating to the illustrated four holes in the part 17. The computer receives the dimensional and tolerancing indication. The tolerance information is inspected through program instructions for syntactic correctness. The word "syntax" as used in this Description is in keeping with the definition contained in ordinary English dictionaries relating to an "orderly or systematic arrangement" or system such as the tolerancing rules of standard "ANSI Y14.5 mentioned hereinbefore. Once the tolerance syntax is determined to be correct, the computer gage generator 11a generates an inspection gage model 21 as seen in FIG. 4. The consistency of the part design tolerance symbolism is therefore confirmed. With knowledge of the design description of the part and the tolerances applied to the described features, an inspection or functional gage using the same tolerance references as the part is constructed by the computer and shown on the display. Accomplishment of such a step is indicated at Ⓐ in FIG. 2. The inspection gage data is stored for future use.

The part designer has made certain dimensional and tolerance call-outs for a part to be used in an assembly. Functional gage data has just been created for the part as described hereinbefore. The system then performs what is called design tolerance analysis as indicated in FIG. 2. The purpose of the tolerance analysis is to determine if the designed part as toleranced will fit under all tolerance conditions with its mating part in the assembly. Details of this portion of the process are illustrated in FIG. 7. A selection must be made by the operator to either analyze tolerances assigned to the part by the designer or define new optimal tolerances for the part. If existing tolerances are to be analyzed, then a worst case part is created by the computer wherein the part is in a "virtual" condition (reference ANSI Y 14.5), that is, the holes are all at the lower limit of the tolerances and any bosses, flanges, etc. are at the upper limit of the tolerances. Further, if holes are dimensioned with respect to true position, their size is further reduced by the amount of positional tolerance defined. This method simulates the condition of the holes as if placed, for purposes of the worst case part, at opposite limits of their allowable positioning tolerances.

Once the worst case part (virtual condition, having maximum material conditions and maximum positional deviation) is constructed by the computer, the tolerance call-out datums are aligned with those of the mating part. The mating part is also constructed by the computer in its virtual condition state. The computer checks for compatibility between the part undergoing tolerance analysis and its mating part. If the worst case parts fit, the design data together with the tolerance data is stored for future use. If the worst case parts do not fit, the process is returned to Ⓖ as seen in FIG. 7. The return of the process to this location occurs so that the design may be improved tolerancewise by creating the holes and/or bosses with different nominal sizes; i.e., a model geometry change.

As may be seen from FIG. 7, if the analyzed existing tolerances do not fit, beginning at Ⓖ, a new check or modification is made on the Part. In one instance new tolerances are obtained through the system input from the designer. A new tolerance syntax check is made relative to the new tolerances. Alternatively, for model geometry change the tolerances are analyzed for the resulting model change. A new gage is then built by the computer, presuming tolerance syntax is correct. Analysis of any new set of existing tolerances involves repetition of the process described immediately hereinbefore.

The CIG system may analyze any set of GD and T specified tolerances. However, the system is currently able to define new tolerances by itself for only two special design cases; fixed and floating fastener cases. In these specific instances where parts are fastened together (held in tension), the fixed and floating fastener analysis of FIG. 7 is undertaken. A bolt is an example of a fastener. It may go through a part or it may be threaded into a part. A fastener is generally selected from Federal standard H-28. The designer chooses the fastener based on stress requirements. The Federal standard provides the screw thread standards for the Federal services including body diameter, bearing area of the fastener and thread length. The target hole size is calculated together with the upper and lower tolerance on the hole size and a true position tolerance is then provided for the hole. The datums for the position of the hole are toleranced with flatness, straightness, roundness and cylindricity tolerance call-outs to guarantee that any possible positional error from the datums is below one-tenth of the true position error toleranced. For example, if the hole true position tolerance is 0.060, any error due to departure from flatness of the datums providing references for the hole position must contribute no more than 0.006 to the hole position error. This serves to guarantee part interchangeability.

The tolerances are thereafter analyzed by the system to ascertain that there is no diminution of fastener bearing surface by virtue of hole position error relative to the mating part for the part being analyzed. Diminution of fastener bearing surface refers to displacement of the fastener laterally in the hole in the part being analyzed to the extent that the bearing surface under the head of a bolt, for example, lies partially over the hole rather than on the material in the part surrounding the hole. In summary it is seen that optimal tolerance analysis (definition of new tolerances) is currently performed by the CIG system for two special cases of GD and T tolerancing, fixed and floating fastener analysis, while worst case analysis (analyze existing tolerances) is performed by the disclosed system for all cases of GD and T tolerancing.

The ensuing step following the performance of design tolerance analysis may be seen from FIG. 2 to involve the generation of an inspection path for the three dimensionally movable member which is a part of the robot 14 of FIG. 1. The details of the step of generating an inspection path are set out in the flow diagram of FIG. 7. The process cannot be entered until it is ascertained that an inspection gage for the part has been built and the analysis of the design tolerances show that the part fits properly with its mating part. After the gage has been built and the tolerance analysis successfully completed, the inspection path graphics are formed and displayed as shown in FIG. 5. The x's indicate measurement points along surfaces A, B and C. Three inspection points on each surface A, B and C define the surface. A probe 22 is shown on the display 12 having a number of tips 22a which are selected to contact one of the inspection points (shown at surface C) of the CAD part model 20. Item 22 of FIG. 5 is termed a probe cluster. A probe vector extends from the probe cluster having a probe tip 22a on the free end thereof. A number of displays are available in the system. A probe vector may be caused to move on the cathode ray tube display to each of the inspection points indicated by the x's in the FIG. 5. Alternatively, the tip 22a for the probe vector in use is caused to flash on the display. Also available is a display in which the probe cluster 22 moves around the part model 20, placing a probe tip in sequence at each inspection point. The path of the probe tip in whatever display is in use in a particular CIG system is a logical progression from one point x to another, considering the shortest distance between points and avoidance of obstacles. The progression is meant to inform the user of the direction from which the probe will physically approach the surface to be inspected and to provide information which may be used to avoid collisions between the probe cluster and the part. Measurements are generated for each specific part feature at each probe contact point. It may also be seen that there are three measurement points associated with each of the four holes in the part 17, whereby each of the holes is fully defined. Having monitored the graphic display of the path, the computer 11 of FIG. 1, upon command, forms a path program in path generation 11b in accordance with the depicted path on the disply. The path program is converted to a program intelligible to the robot 14, and the inspection path data is then stored for future use. The combination of this portion of the process is indicated at Ⓑ in both FIGS. 2 and 7.

If a modification of the inspection path is desired, a function is entered through the keyboard 13 and the cursor or vector on the display 12 is controlled by the user. A menu of desired changes in the inspection path is presented to the user who may wish to add an inspection point to a surface, or to reroute the movement of the movable member to avoid an obstacle. In the event an additional inspection point on a surface is to be designated for inspection, such a function is selected, the cursor is moved to the additional inspection point and the program is informed through the keyboard of the addition. In the instance where the path for the movable member is to be altered for purposes of avoiding an obstacle, the indicated function is selected and the cursor is moved to a point or points in succession on the display through which it is now desired that the movable member shall pass to avoid the obstacle. The new points are entered into the path program through the keyboard and the program descriptive of the path of the movable member is thus altered. Following creation and/or modification of the inspection path, the path program created by the path generator 11b in computer 11 may be called up and displayed as the cursor undertakes motion throughout the entire inspection path which is indicative of the motion sequence followed by the movable member on the robot 14.

As seen in FIG. 2, following generation of the inspection path and any desired modifications thereto, the next portion of the process relates to job execution. Job execution refers to any job which may be performed by the system including cutting parts, performing statistical process control, etc. Jobs may be executed manually by inputs through the keyboard or automatically under the control of the computer 11. When automatic control is desired, first the job control language is defined as hereinafter described. Thereafter, job execution is simulated by a display on a screen. All steps to be run are simulated on the display. Auto job control is then called by the operator subsequent to a determination that the job simulation is acceptable. The criteria for acceptance is that all analysis runs are correct, with zero deviation from perfection. The operator makes the determination to call auto job control by referring to a menu on the system display called "run job" from which he chooses either manual or automatic.

With reference once again to FIG. 2 the next undertaking in the process of the present invention is to measure data from the manufactured part 17. Measurement of the physical features of the manufactured part 17 is only undertaken after the inspection gage has been built and the inspection path has been generated as described hereinbefore and as seen in FIG. 8. Further, a determination is made as to whether the job is to be executed manually by the operator or automatically by the system, as also hereinbefore described. In the event automatic job control is implemented, the stored job control program is called up as indicated at Ⓔ (FIG. 8) and the process continues under control of the computer 11. Otherwise, the subsequent functions are sequenced manually by keyboard selection of various menu items on the part of the operator.

The orientation of the part 17 on the support surface 18 is sensed by the camera 16 attached in a known location over the working volume as seen in FIG. 1. The part orientation is used to orient the inspection path created by path generator 11b as it is to be followed by the movable member such as probe 22 (FIG. 5). The movable member is moved along the oriented inspection path by operation of the robot 14. Position data for the physical features of interest on the manufactured part 17 are obtained by the sensor 19 (NCI or CMM) attached to the robot and the measured data is transmitted to a structural part generator 11c in computer 11 where it is converted to a form which may be brought up visually as the model 17a (FIG. 6B) of the manufactured part on the display 12. The measured model 17a of the manufactured part 17 is then placed in storage for future use. This is indicated in FIGS. 2 and 8 at Ⓒ.

As indicated in FIG. 2 following Ⓒ, the measured data for the manufactured part 17 (used by structural part generator 11c to construct the measured model 17a) is analyzed statistically, as will hereinafter be described in detail in conjunction with FIG. 9 and a determination is made either by the operator or by the job control program (whichever is in control) as to whether the measurement data will be analyzed relative to the inspection gage constructed at Ⓐ or from the standpoint of the measurement history of the population of those parts, or both. In the case of analysis relative to the measurement history of the population of those parts, a statistical analysis of the measurement is performed and a determination is made from the measurement as to whether the process is in control, as hereinafter described. An out of control process is stopped and the reason for the statistical aberration is identified. In the case of analysis relative to the constructed inspection gage, the measurement data is compared to the inspection gage 21 of FIG. 4. Both analysis relative to the functional or inspection gage and statistical analysis of the measurements proceed simultaneously in computer 11 by means of an analysis/comparison generator 11d. As seen in FIG. 9, data representing the inspection gage 21, the inspection path between inspection points of FIG. 5, and the measurements from the parts 17 must be complete before the comparison step or the statistical survey may be undertaken. Statistical data from the process is updated considering the measured part data. This updates the parts fabrication history. The type of comparison or analysis to the undertaken, gage or statistical, is decided by the operator or otherwise in the job control language. When gage analysis is selected, the inspection gage 21 and the measured manufactured part 17a data are called up and compared graphically on display 12 as well as mathematically in the computer 11 by analysis/comparison generator 11d. The gage 21 of FIG. 6A is generally shown in the color green on the display and the model 17a of the manufactured part 17 as measured may be brought up on the display in the color cyan (light blue). The gage and manufactured part models are then caused to overlie so that a visual depiction of the manufactured part in comparison with the gage is shown. The colored visual picture comparison is only for the visual comfort of the operator and for verification. It may readily be determined visually if the gage and the part have any intersecting surfaces, because of the different colors assigned to each. However, it is the mathematical comparison results generated by the computer which are subsequently used and are at this time stored as indicated at Ⓓ in FIGS. 2 and 9. The comparison results are held in RAM for availability to other systems which may function in conjunction with the disclosed integrated gaging system.

The comparison rsults are then formulated in the form of an error report as seen in FIG. 9. The error report is then called up on the graphic display 12. If there are no errors, a green light is illuminated to indicate that the manufactured part is within tolerance. If there are out of tolerance measurements, they are investigated to see if they can be reworked, so that the manufactured part may be saved. This is done in the illustrated instance by calling CAD/CAM data and inspection data from RAM and graphically enlarging the holes in the manufactured part to their largest allowable size (least material condition) and, by means of the analysis/comparison generator 11d comparing once again the reworked holes on the manufactured part model to the gage 21. If the gage fits the part, a yellow light is illuminated which indicates that the part is reworkable. If the gage does not fit the reworked model of the manufactured part, a red light is illuminated indicating that the manufactured part should be scrapped as not reworkable.

When statistical analysis is selected, the statistical history of a measured dimension of a specified part is reviewed by the analysis/comparison generator 11d of computer 11. A constant monitor is provided in computer 11 for measured dimensional quantities for statistical purposes. The last entered part measurement is reviewed to determine if the process is in control. That means a determination is made as to whether the measurement is included within the area defined under a normal distribution bell curve and within plus or minus three standard deviations (plus or minus three sigma) from the mean of the normal distribution. If the last measured dimensional quantity is within the plus or minus three sigma limits of the normal distribution, the program returns to measure further data from the part. If a maverick point occurs falling outside the plus or minus three sigma limits defined under the bell curve, the process is stopped and the statistical ranges for that measurement quantity are displayed. The cause of the error is thus determined by analyzing trends in the statistical process history. The process is then repaired so that maverick points are less likely to occur.

The following is an abbreviated program listing depicting one manner in which a program may be formulated for operating the disclosed system in performing the disclosed gage and inspection module processes.
© FMC Corporation 1987.

```
SUBROUTINE CX190

PURPOSE:  TO SAVE THE CURRENT MODAL SETTINGS THAT WE
          CHANGE,
          TO SET UP THE INITIAL CIG MODALS
          TO INVOKE THE CIG FUNCTIONS VIA AN
          ANVIL MENU SELECTION OF 5,11,7
          TO RESET THE OLD MODALS ON EXIT FROM CIG
          MODIFIED TO SET THE IMPLICIT POINT MODE TO
          DEFINE AS DISPLAYED
          ON ENTRY TO CIG - RESTORES TO PREVIOUS VALUE
          ON EXIT
          MODIFIED TO NOT CHECK THAT A DCS IS ACTIVE
          UPON ENTRY TO CIG SOFTWARE
          MODIFIED TO SET THE DEPTH ENTRY MODAL MVIEW
          (15) AND TO SET THE TIME PERIOD BETWEEN
          FILING FLAG IMODE(39)
          MODIFIED TO REENABLE THE USERS DCS ON EXIT

SET PDQFLG=0 ON ENTRY AND
          SAVE SET GEOMETRY PRESENTATION MODAL
          (IMODE(8))
```

TO INDICATE GEOMETRY IN ALL VIEWS, AND
DRAFTING IN WORK
VIEW ONLY.

STORE GAGE FILE RELATIVE POSITION POINTERS
SO THAT OLD GAGE FILES COULD BE RESTORED
IUSER(7),IUSER(8),IUSER(9)

ARGUMENTS:

| TYPE | NAME(DIM) | I/O | DESCRIPTION |

SUBROUTINES CALLED:

ANVIL VERSION 1.5
USER WRITTEN -

LOCAL VARIABLES:

| TYPE | NAME(DIM) | DESCRIPTION |

Define local COMMON block to for device type to TEKA,
TIKE, TEKO, and TERMA
LMODE = 1 implies last output was to alpha device
      = 0 implies last output was to graphics device
FMCDV = 0 implies standard mcs device
      = 1 implies Retro-Graphics input and output
          device
      = 2 implies Code Activated Switch in use

DATA INITIALIZATION

BEGIN PROCEDURE

CALL MVBITS (1,0,1,IMODE(30),1)   !SET BIT POSITION
                                  !1 TO 1 WHICH SAYS
                                   CTRLW
                                  !ENABLED

SET PDQMOD FLAG SO WE KNOW WHICH CORELOAD TO RETURN TO

SET PDQFLG TO INDICATE NORMAL USER INTERACTION WITH
CIG. THIS HELPS CLRALPHA/IG08 CLEAR CORRECTLY WHEN
NECESSARY

SET GOSW(10)= PDQMOD, SO WE CAN REENTER AT TOP OF THIS
ROUTINE

IF CX190 IS BEING REENTERED VIA A CTRLI HIT FROM INSIDE CIG, THEN DO NOT REINITIALIZE MODALS ETC.

IF (REENTER190) THEN !REENTER190 IS SET BY GRU03 IF CTRLI HIT CALL PDQINIT(1) !REINITIALIZE PDQ JUMP ARRAY TO INDICATE NO
END IF

THIS IS PDQCON LEVEL 1 WHICH MEANS THAT IT IS THE 1ST LEVEL OF IMBEDDED SUBROUTINE CALLS AFTER A CLINK IS DONE. TO CONTROL RETURNS FROM CLINKS IN THIS LEVEL, SET PDQCON(1).

WARNING: LOCATION 9999 IN THIS GO TO IS LINKED TO CLEANUP190. ANY CHANGE TO ITS LOCATION IN THIS LIST MUST BE REFLECTED IN THE VARIABLE CLEANUP190

GO TO (1000,2000,3000,4000,5000,6000,9999,7000,8000,8500, & 9000),PDQCON(1)

FIRST FRESH CALL TO CX190 - SAVE IMODE(146) PERIOD BETWEEN FILINGS AND SET TO 0. THIS MUST BE DONE AT THIS LEVEL BECAUSE THIS MODAL MUST BE TURNED OFF BEFORE ANY CALL TO ANVIL.

SET RELATIVE RGAGE POINTERS

INITIALIZE THE IUSER ARRAY IF THIS IS THE FIRST TIME USER HAS RUN THIS PART THROUGH THE CIG SYSTEM

IF (IUSER(1).LT.0) THEN
        FIRST TIME THROUGH
        DO 400 I=1,128

400 CONTINUE

END IF

INITIALIZE DEFAULT FILE NAME SPECIFICATION
SO THAT OPNPRTFIL WILL USE CURRENT PARTS NAME AS FILE NAME

DETERMINE WHERE ALPHAOUT IS GOING AND SET ALPHAOUT ACCORDINGLY

SET ALPHA OUTPUT TERMINAL TYPE

SET ALPHA OUTPUT TERMINAL TYPE
CALL LDBIT(IMODE(14),ALPHADEV,5,0)

SET WHERE ALPHA INPUT IS COMING FROM
CALL LDBIT(IMODE(14),ALPHAFROM,10,9)
DETERMINE WHERE ALPHA OUTPUT IS GOING AND WHERE ALPHA INPUT IS COMING FROM

IF(FMCDV.EQ.0) THEN

IF(ALPHAFROM.EQ.0) THEN

ALPHA INPUT IS COMING FROM GRAPHICS DEVICE

DETERMINE GRAPHICS DEVICE TYPE

IF(IMODE(57).EQ.0) THEN

TEKTRONIX 40xx TERMINAL BEING USED

ELSE IF (IMODE(57).EQ.15) THEN

TEKTRONIX 41xx TERMINAL BEING USED

END IF

ELSE

ALPHA IS COMING FROM ALPHA DEVICE
        USE VT100 KEYBOARD INPUT SET

END IF

DETERMINE ALPHA OUTPUT DEVICE

IF(ALPHADEV.EQ.0) THEN

ALPHA OUTPUT IS GOING TO GRAPHICS DEVICE

DETERMINE GRAPHICS DEVICE TYPE

IF(IMODE(57).EQ.0) THEN

TEKTRONIX 40xx TERMINAL BEING USED

```
        ELSE IF (IMODE(57).EQ.15) THEN
            TEKTRONIX 41xx TERMINAL BEING USED

END IF

ELSE IF(ALPHADEV.EQ.1) THEN
        ALPHA IS GOING TO A VT100 ALPHA DEVICE

END IF

ELSE IF(FMCDV.EQ.1) THEN

RETRO GRAPHICS TERMINAL USING VT100 FOR ALPHA
    INPUT AND OUTPUT

ELSE IF(FMCDV.EQ.2) THEN

4014 WITH CAS. USING 4014 FOR ALPHA INPUT AND
    ALPHA TERMINAL FOR ALPHA OUTPUT

END IF

TURN OFF WRITES TO ALPHA TERMINAL

CALL ALPHAOFF

ON FIRST NEW ENTRY,SAVE GOSW SETTINGS TO RETURN TO
THIS CORELOAD (190) WHEN REQUIRED

SET UP MENUS TO SAVE THE CURRENT CURVE WEIGHT TABLE IN
UTF

CALL MENWTSAV(NBCHARS,CURWTS)

SAVE WEIGHT TABLE

CALL CLINK(2)

1000 CONTINUE

SET UP MENUS TO RESTORE PREDEFINED WEIGHT TABLE FOR
LATER USE
```

CALL MENWTRET(NBCHARS,CIGWTS)

RESTORE THIS TABLE

CALL CLINK(2)

2000 CONTINUE

SAVE CURRENT PART DEFAULT CURVE WEIGHT

SAVE CURRENT PART DEFAULT CURVE FONT

SAVE CURRENT PRESENTATION MODE MODAL

SAVE CURRENT PART DEFAULT CURVE COLOR

SAVE CURRENT PART SELECTION MODE

SAVE CURRENT PART SURFACE PATH DISPLAY MODALS

SAVE TEXT ORIGIN MODAL AND TEXT JUSTIFICATION

SAVE IMPLICIT POINT MODE

SAVE DEPTH ENTRY MODAL

SAVE CURRENT VALUE OF DEFAULT LEVEL

SET PRESENTATION MODAL TO INDICATE GEOMETRY IN ALL VIEWS, DRAFTING IN WORK VIEW ONLY

SAVE CURRENT IMODE 180 WHICH CONTROLS DRAFTING EXTENT, TRIM CURVE MODE,BLANK AND UNBLANK,FILLET MODE,ROTATION MODE,MIRROR MODE

SET IMODE 180 TO DEFAULT =0 WHICH IMPLIES

DRAFTING=ONE ENT ONE CHANGE,
TRIM CURVE=VISUAL IN WORK VIEW
BLANK/UNBLANK=TEMPORARY

```
FILLET = VISUAL IN WORK VIEW
ROTATION = 2D WORK VIEW
MIRROR MODE = EXISTING LINE OR PLANE

SET SELECTION MODAL TO ALLOW FOR POINTER SELECTION

SET IMPLICIT POINT MODE TO DEFINE AS DISPLAYED

CALL MVBITS (2,0,2,IMODE(146),0)  !SET BIT POSITION
                                  !0 AND 1 TO 10
                                  !DISPLAY WHERE DEFINED
SET THE DEPTH ENTRY MODAL TO DATA ENTRY MODE

ALLOW FOR SPECIAL JUMPS VIA A CTRL SPACE

SAVE ACTIVE DCS POINTER SO THAT THE USER DCS CAN BE
REACTIVATED ON EXIT

DO WHILE REJECT OR OP COMPLETE NOT HIT

DO WHILE(.NOT.(TERMINATE))
        REENTER CX190 HERE ON RETURN FROM CX191,CX192
        AND CX193

3000 CONTINUE
        CALL PDQINIT(1)

DISPLAY TOP LEVEL CIG MENUS AND FIND OUT WHAT USER
WANTS TO DO

TURN ON ALPHA TERMINAL

CALL ALPHAON

CALL CIGMENUS(MENUNUM,INTVAL)

TURN OFF ALPHA TERMINAL

CALL ALPHAOFF

MENU PICKED IS IN GOSW(4)
```

```
IF (MENUPICKED.EQ.2) THEN
        USER WANTS TO RUN GAGE/ZONE CONSTRUCTION

4000 CONTINUE

CALL CX191

ELSE IF (MENUPICKED.EQ.3) THEN
        USER WANTS TO RUN INSPECTION PATH GENERATION

5000 CONTINUE

CALL CX192

ELSE IF (MENUPICKED.EQ.4) THEN
        USER WANTS TO RUN MEASURED DATA COMPARISON

6000 CONTINUE
        CALL CX193

ELSE IF(MENUPICKED.EQ.98 .OR. MENUPICKED.EQ.99) THEN

END IF

END DO

9999 CONTINUE

TURN OFF ALPHA TERMINAL

CALL ALPHAOFF

USER WANTS TO TERMINATE CIG MODULE.
RETURN ANVIL DEFAULTS TO THEIR ORIGINAL VALUES
AND RETURN USER TO APPROPRIATE ANVIL MENU

RESET ALL MODALS WE HAVE TOUCHED

RESTORE OLD WEIGHT TABLE
```

```
CALL MENWTRET(NBCHARS,CURWTS)

RESTORE THIS TABLE

CALL CLINK(2)

7000 CONTINUE

MAKE SURE THE USERS DCS IS ACTIVE BEFORE WE LEAVE

IF (ACTDCSPTR.NE.0) THEN
    CALL MENACTPTR(ACTDCSPTR)
    CALL GRAPHON
    CALL CLINK(2)
ELSE
    CALL MENRTWRVU
    CALL CLINK(2)
END IF

8000 CONTINUE

RESET OLD MODALS

RESET DEFAULT LEVEL

CALL MENDEF(LEVELSAVE)

CALL CLINK(2)

8500 CONTINUE

BLANK ALL GAGES IN CASE THEY CURRENTLY ARE NOT BLANKED

CALL MENBLKLVL(LVL1,LVL2)

CALL CLINK(2)

9000 CONTINUE

CALL GRAPHOFF
```

RESET REMAINING FLAGS WE USED
!IF NORMAL ANVIL JUMP KEY HIT (cF,cP...)
!THEN GOSW3SAV WAS SET IN GRU3A BEFORE
 COMING HERE

INITIALIZE PDQCON FOR NEXT ENTRY INTO CIG MODULES

CALL PDQINIT(1)

TURN ALPHA TERMINAL BACK ON

CALL ALPHAON

TURN GRAPHICS BACK ON

CALL GRAPHON

CLEAR ANY LEFT OVER ALPHA TEXT FROM DISPLAY

CALL CLRALPHA

SEE YOU LATER

10500 CONTINUE

IMODE(180) HAS TEMPORARY/PERM BLANK UNBLANK IMBEDDED IN IT. IT MUST BE RESTORED AFTER THE BLANK LEVELS 801 TO 899 TO AVOID POSSIBLE ERROR CONDITION

THIS FLAG IS SET AS THE VERY LAST THING BEFORE RETURNING TO ANVIL FROM CIG
IF ANY MENXXXXXX CALL TO ANVIL IS EXECUTED WITH PERIODIC FILING ON, THEN ERRORS ARE LIKELY TO OCCUR.

CALL CLINK(2)

END

SUBROUTINE CX191

PURPOSE: TO CHECK THE GEOMETRIC TOLERANCE CALLOUTS
FOR SYNTACTIC CORRECTNESS TO SEE IF THEY
CONFORM TO ANSI Y14.5 AND TO
GENERATE THE GAGES AND ZONES THEY DESCRIBE

MODIFIED: ADDED GAGEHOLE TO PICKS CALL
ADDED GAGEHOLE TO GAGES CALL
ADDED MENU SELECTIONS FOR DISPLAY DATUM AND
DEFINE BLOCK TOLERANCES
ARGUMENTS: NONE

OUTPUT: RGAGE ARRAY CONTAINING ALL THE INFORMATION
NECESSARY TO GENERATE THE GAGES.
ALSO, OUTPUTS ERROR MESSAGES FOR INCORRECT
DESIGN.

SUBROUTINES CALLED:

ANVIL VERSION 1.5 - CLINK,REPNT,GRU3B,IG06

USER WRITTEN:
        RESLVDAT - RESOLVES DATUM LETTERS STORED
                  IN RGAGE
        CIGMENUS - DISPLAYS MENU CHOICES
        PICKS    - INPUTS THE USER ENTITY PICKS
        MODIFY   - MODIFIES DATUMS & RGAGE
                  (GAGES)
        RESLVDAT - RESOLVES THE EXISTENCE OF ALL
                  DATUMS BEFORE GAGE OR ZONE
                  CONSTRUCTION
        GAGES    - GENERATES ALL GAGES IDGAGE
                  FROM 10 TO 71
        ZONESP   - GENERATES SP ZONE IDGAGE FROM
                  110 TO 113
        DISPLAY  - DISPLAYS GAGES/ZONES

LOCAL VARIABLES:

| TYPE | NAME(DIM) | DESCRIPTION |
| --- | --- | --- |
| INTEGER | IUDAT | !POINTER IGAGE FOR DATUM FEATURE |
|  |  | !OF SIZE. THIS DETERMINED IN |
|  |  | !NOTE THIS IS STORED IN COMMON |

RETURN TO STATEMENT AFTER THE LAST CALL TO CLINK(2)

DEFINE TYPE TO BE .GAG FOR FILE TERMINATOR

```
    GO TO (19000,19100,19200,19700,10710,19800,19900,19910,
   &       20010,20100,20110,20120,20130,20140),
           PDQCON(2)

INITIALIZE DATA.  ALL THESE VARBS. ARE IN CX191COM.FOR

THESE ARE SET IN CX190 NOW, AND ARE PART OF PDQCOM
    ITPREL  = 27
    ISPREL  = 27
    ISTORUS = 257
    IARCREL = 10
    IDIMREL = 10

DETERMINE IF GAGES HAVE BEEN PREVIOUSLY CREATED FOR
    THIS PART AND IF SO, RETRIEVE THE IGAGE/RGAGE DATA
    FROM FILE

IF(IUSER(2).NE.1 .AND. IUSER(1).EQ.1) THEN

IGAGE AND RGAGE DATA HAS NOT BEEN RESTORED
            FROM FILE YET

OPEN FILE GAGE FILE WHICH CONSISTS OF
            partname.GAG OR CREATE FILE IF IT DOESN'T
            EXIST

WRITE THIS MESSAGE TO SCREEN AT TOP LEFT
            CALL FORWRITE(0,0,0)

DO WHILE BAD FILE NAMES ENTERED, OR USER HITS
            REJECT IN FORCERESP

DO WHILE (STAT.LT.0)
                CALL OPNPRTFIL(IUNIT,TYPE,MODE,STAT)

IF(STAT.LT.0) THEN
                    COULDN'T OPEN GAGE FILE
                    CALL FORWRITE(0,ERR_LINE,0)
                    CALL FORCERESP(1,1)   !REJECT WILL
                    GO BACK TO MAIN CIG MENUS
                END IF
            END DO

READ IN GAGE DATA IF IT SHOULD BE ON FILE
```

```
        IF (IUSER(1).EQ.1) THEN
            CALL RESTGAGE(IUNIT,ERROR)

END IF

CLOSE GAGE FILE AFTER READING DATA

IF(ERROR) THEN
            CALL FORWRITE(0,0,0)
            CALL FORCERESP(1,1)   !REJECT WILL GO BACK
                                   TO MAIN CIG MENU

GO BACK TO MAIN MENUS
            GO TO 9000

END IF
END IF

1000 CONTINUE

DETERMINE IGAGE STARTING LOCATION FOR NEXT GAGE/ZONE
CREATED BASED ON THE TOTAL NUMBER OF GAGES/ZONES SO
FAR CREATED

DETERMINE THE STARTING VALUE FOR IGAGE(IUSTART) WHICH
POINTS TO SUBSCRIPT OF RGAGE TO START STORING STUFF

IF(IUSTART .GT. 1) THEN

IF IGAGE(IUSTART-1) IS TP,SP,COMBO,ARCS, OR
        DIMENSIONING THEN HAVE TO COMPUTE THE NUMBER
        OF ENTITIES DIFFERENTLY.  THE PROCEDURE HERE
        MUST BE UPDATED WITH CHANGES IN FUNCTIONAL
        SPECIFICATIONS.

IF(IDGAGE .EQ. 140 .OR. (IDGAGE .GE. 10 .AND.
        IDGAGE .LE. 81)) & THEN

HAVE A TP (OR COMBO) CALLOUT IN IGAGE
            (IUSTART - 1)

ELSE IF(IDGAGE .GE. 110 .AND. IDGAGE .LE. 113)
        THEN

HAVE A SP CALLOUT IN IGAGE(IUSTART - 1)

IF(ZONETYPE.EQ.1) THEN

THIS IS A BILATERAL PROFILE
```

TOLERANCE ZONE SO WE STORE NOMINAL
                AND INNER AND OUTER ZONE PTRS
            ELSE
                THIS IS A UNILATERAL PROFILE
                TOLERANCE ZONE SO WE STORE NOMINAL
                AND INNER OR OUTER ZONE PTRS
            END IF

ELSE IF(IDGAGE .EQ. 120) THEN
            HAVE A +/- DIMENSION

ELSE IF(IDGAGE .EQ. 130) THEN
            HAVE A +/- HOLE POSITION
        END IF

END IF

WHILE THE USER HAS NOT SPECIFIED [OR]..........DO

DO WHILE (.NOT. TERMINATE)

11000 CONTINUE
        FIRST ERASE ANY MESSAGES ON THE ALPHA SCREEN
        CALL CLRALPHA

RETURN THROUGH HERE IF USER HITS R,CR or Z

19000 CONTINUE

REQUEST MENU CHOICES 1-2

CALL CIGMENUS(12, IDUM)

CALL PDQNIT(2)                          !INITIALIZE PDQCON
                                         FROM 2 ON...

IF (MCHOICE.EQ.98 .OR. MCHOICE.EQ.99) THEN
        REJECT OR OP COMPLETE HIT
ELSE

DON'T TERMINATE YET

END IF

1400 CONTINUE

IF(.NOT.TERMINATE .AND.
& MCHOICE .GE. 0 .AND. MCHOICE .LE. 8) THEN
        IF(MCHOICE .EQ. 1) THEN
            DEFINE DATUMS

19100 CONTINUE
            CALL DDPICKS(ERROR)
        ELSE IF(MCHOICE .EQ. 2) THEN
            DEFINE TP, SP, PT, CX, SP

19200 CONTINUE
            CALL TPPICKS(GAGEHOLES, ERROR)
        ELSE IF(MCHOICE .EQ. 3) THEN
            CREATE PLUS MINUS ZONE
            CALL PDQINIT(2)

19700 CONTINUE
            CALL PMPICKS(ERROR)
        ELSE IF(MCHOICE .EQ. 4) THEN
            DISPLAY A GAGE
            CALL PDQINIT(2)

19710 CONTINUE
            CALL DISPLAY
        ELSE IF (MCHOICE.EQ.5) THEN
            DELETE A GAGE
            CALL PDQINIT(2)

19800 CONTINUE
            CALL DELGAGES
        ELSE IF(MCHOICE .EQ. 6) THEN
            DISPLAY DATUMS
            CALL PDQINIT(2)

```
19900 CONTINUE
            CALL DISPDAT !DISPLAY DATUM DEFINITIONS
        ELSE IF (MCHOICE.EQ.7) THEN
            DEFINE BLOCK TOLERANCES
            CALL PDQINIT(2)
19910 CONTINUE
            CALL DEFINBLK
        END IF
        CALL PDQINIT(2) !INITIALIZE PDQCON FOR LATER
USE
        ELSE IF (MCHOICE.EQ.98 .OR. MCHOICE.EQ.99)
THEN
            REJECT OR OP COMPLETE HIT, SO RETURN TO
            MAIN CIG CORELOAD NAMELY CX190
        ELSE
            NOT A VALID CHOICE

END IF

IF(.NOT. TERMINATE .AND. .NOT. ERROR .AND. VALID  .AND.
&  (MCHOICE .EQ. 2 .OR.MCHOICE.EQ.3)) THEN
                THE ANVIL DATABASE HAS BEEN PROCESSED AND
                STORED INTO RGAGE.  THE RGAGE(IGAGE(IU))
                ARRAY CONTAINS THE DATA NECESSARY  TO
                GENERATE  A  GAGE.   ALL  TEST HAS PASSED
                PARSING TESTS.

IF A COMPOSITE GAGE, I.E., MULTIPLE TP'S
                OR CZ'S OR PT'S (MAX OF 3), THEN DISPLAY
                THE GAGES IN THE ORDER THEY WERE PICKED.
                IU = INDEX FOR THE GAGE WHICH WILL BE
                DEFINED  NEXT  AT  THIS  POINT IN THE CODE
                WE HAVE (IU - 1) GAGES DEFINED.
                IUGAGE = INDEX OF  THE  NEXT  GAGE  TO  BE
                DISPLAYED.

SET RGAGESTRT FOR LATER USE IN NM03

DISPLAY THE GAGES/ZONES

DO WHILE (IUGAGE .LT. IUMAX)
                    NOW RGAGE FOR CURRENT GAGE IS
                    COMPLETELY  FILLED,  DETERMINE  THE
                    GAGE TYPE AND THEN CONSTRUCT GAGE.
                CALL GDTTYPE(ERROR)
        IF(.NOT. ERROR) THEN
            IF (IDGAGE.EQ.80) GO TO 20010
            GO  TO (20010,   20010,   20010,   20010,
            20010,  &  20010, 20010, 20080, 20090,
            20100, 20110, & 20120, 20130, 20140),
```

```
            IDGAGE/10
            CALL PDQINIT(2)   !INITIALIZE FROM2 ON

20010 CONTINUE

CONSTRUCT THE GAGE SPECIFICED BY
            IDGAGE
            CALL GAGES (GAGEHOLES)
            GO TO 30000

20080 CONTINUE

DUMMY GAGE

20090 CONTINUE

DUMMY GAGE

20100 CONTINUE

CONSTRUCT A LINE PROFILE
            CALL ZONESP
            GO TO 30000

20110 CONTINUE

CONSTRUCT A SURFACE PROFILE (SAME
            AS LINE PROFILE FOR NOW)
            CALL ZONESP
            GO TO 30000

20120 CONTINUE

CONSTRUCT A +/- ZONE FOR ENTITY
            CALL ZONEPLMI
            GO TO 30000

20130 CONTINUE

CONSTRUCT A +/- ZONE FOR HOLE
            POSITION
            CALL ZONEDUMY(IDGAGE)
            GO TO 30000

20140 CONTINUE

CONSTRUCT A COMBINATION GAGE
            CALL ZONEDUMY(IDGAGE)
```

```
30000   CONTINUE
                    END OF COMPUTED GO TO ON GAGE TYPE
                    SET PDQCON SO THAT OTHER ANVIL  CALLS  ARE
                    HANDLED LOCALLY.
             END IF
             CALL PDQINIT(2)

END DO

END IF
END DO

9000 CONTINUE

TERMINATE CX191 EXECUTION AND RETURN TO CX190

SET   IGAGE  TO  BE  CONSISTANT  WITH  NUMBER  OF  GAGES
ACTUALLY CREATED (IUSER(3))

RESET IUSER(1) AND  IUSER(2)  IF  NO  GAGES/ZONES  HAVE
BEEN CREATED

IF(IUSER(3).LE.0) THEN
         NO GAGES/ZONES EXIST FOR THIS PART YET

END IF

GO TO CIG MAIN MENUS CX190

INITIALIZE PDQCON FROM (2) TO (7)

CALL PDQINIT(2)

SET PDQCON(1)=3 SO THAT WE REENTER
CX190 AT THE MAIN MENU REQUEST
CALL CLINK(PDQMOD)

END

SUBROUTINE CX192
```

PURPOSE: MAIN DRIVER FOR NC PATH GENERATION

TO GENERATE A NC PATH THAT CONTAINS POINTS ON EAC
ENTITY OF A PART THAT IS TO BE CHECKED FOR TOLERANCES

MODIFIED:
        REARRANGED THIS DRIVER TO ALSO ALLOW FOR
        5 AXIS POINT TO POINT PATH GENERATION

ARGUMENTS:

TYPE      ARGUMENT      I/O      DIM      DESCRIPTION

SUBROUTINES CALLED:

ANVIL VERSION 1.5 - CLINK
USER WRITTEN SUBROUTINES - INSPCNTRL,DISPPATH,
MODIFPATH,PDQINIT

LOCAL VARIABLES:

TYPE      NAME      DIM      DESCRIPTION

THIS IS PDQCON LEVEL 2 WHICH MEANS THAT IT IS THE 2ND
LEVEL OF IMBEDDED SUBROUTINE CALLS AFTER A CLINK IS
DONE. TO CONTROL RETURNS FROM CLINKS IN THIS LEVEL,
SET PDQCON(2).

GO TO (1000,2000,3000,4000,5000,6000,7000),PDQCON(2)

DATA INITIALIZATION

SET DEFAULT LEVEL FOR PATHS AND POINTS CREATED

DO WHILE (.NOT.TERMINATE)

1000 CONTINUE
     ASK USER TO PICK INSPECTION MENU
     CALL CIGMENUS(13,IDUM)
     CALL PDQINIT(2)

IF(MCHOICE.EQ.98 .OR. MCHOICE.EQ.99) THEN
               REJECT OR OP COMPLETE HIT
               DO NOT ALLOW AN EXIT UNLESS PATH FILED
               OR DELETED. ALSO DELETE HOME PT IF ONE
               CREATED.

```
CHECK TO SEE IF A HOME POINT HAS BEEN CREATED

IF(HOMEXIST) THEN

HOME POINT EXISTS.  CHECK TO SEE IF A PATH
        HAS BEEN CREATED.

IF(PHEXIST) THEN

SINCE A PATH EXISTS, THE USER HAS NOT
            FILED THE PATH.  THEREFORE, FIND OUT IF
            WISHES TO FILE OR DELETE THE PATH OR
            RETURN TO THE MENUS

2000 CONTINUE

CALL CIGMENUS(16, IDUM)
            CALL PDQINIT(2)

IF(IANS .EQ. 1) THEN

USER WISHES TO FILE THE PART

CALL FILEPATH
            ELSE IF(IANS .EQ. 2) THEN

USER WISHES TO DELETE THE PATH

CALL DELEPATH
            ELSE IF(IANS .EQ. 3) THEN

RETURN TO MENUS FOR CREAT/MODIF/
                DISP/FILE

ELSE IF(IANS .EQ. 98 .OR. IANS .EQ. 99)
            THEN

REJECT OR OP/COMP.  SEND WARNING
                THAT MUST ANSWER WITH 1,2, OR 3.

CALL FORWRITE(0, 0, 0)
                CALL FORCERESP(2, 2)
            END IF

ELSE

NO PATH EXISTS, BUT HOME PT DOES.
            DELETE THE HOME POINT BEFORE EXITING

CALL MENDELPTR(1, HOMEPTR)
            CALL CLINK(2)

3000 CONTINUE

END IF

ELSE

HOME PT DOES NOT EXIST

END IF
ELSE IF(MCHOICE.EQ.1) THEN

USER WANTS TO CREATE INSPECTION PATH

CALL MENDEF(PATHLEV)
    CALL CLINK(2)
```

```
4000 CONTINUE
NOTE:   DOUBLE USER OF S.N. 4000 FOR CLINK & INSPCNTRL

GO TO THE DRIVER FOR PATH GENERATION

CALL INSPCNTRL
    CALL PDQINIT(2)              !INITIALIZE FROM 2 ON

ELSE IF (MCHOICE.EQ.2) THEN
    USER WANTS TO MODIFY INSPECTION PATH FOR A GIVEN
    LEVEL OR POSSIBLY JOIN PATHS ON DIFFERENT LEVELS

5000 CONTINUE
        CALL MODIFPATH
    CALL PDQINIT(2)              !INITIALIZE FROM 2 ON

ELSE IF (MCHOICE.EQ.3) THEN
    USER WANTS TO DISPLAY PATHS AGAIN

6000 CONTINUE
        CALL DISPPATH
ELSE IF(MCHOICE .EQ. 4) THEN
    USER WISHES TO FILE THE PATH CREATED

7000 CONTINUE
    CALL FILEPATH
    CALL PDQINIT(2)
    END IF
END DO
GO TO CIG MAIN MENUS CX190
INITIALIZE PDQCON
CALL PDQINIT(2)
SET PDQCON(1) SO WE ASK FOR MAIN CIG MENUS IN CX190

CALL CLINK(PDQMOD)

END

SUBROUTINE CX193
```

PURPOSE:
MAIN CORELOAD TO COMPARE MEASURED DATA AGAINST GAGES OR ZONES

ARGUMENTS:

| TYPE | NAME(DIM) | I/D | DESCRIPTION |
|------|-----------|-----|-------------|

SUBROUTINES CALLED:

ANVIL VERSION 1.5 -
USER WRITTEN -

LOCAL VARIABLES:

| TYPE | NAME(DIM) | DESCRIPTION |
|------|-----------|-------------|

THIS IS PDQCON LEVEL 2 WHICH MEANS THAT IT IS THE SECOND LEVEL OF IMBEDDED SUBROUTINE CALLS AFTER A CLINK IS DONE. TO CONTROL RETURNS FROM CLINKS IN THIS LEVEL, SET PDQCON(2).

GO TO (1000,2000,3000,4000,5000),PDQCON(2)

ASK USER TO PICK INSPECTION MENU

DO WHILE(.NOT TERMINATE)

1000 CONTINUE

CLEAR ALPHA SCREEN

CALL CLRALPHA

CALL CIGMENUS(14,IDUM)

CALL PDQINIT(2)

IF(MCHOICE.EQ.98 .OR. MCHOICE.EQ.99) THEN

REJECT OR OP COMPLETE HIT

ELSE IF (MCHOICE.EQ.1) THEN

USER WANTS TO RETRIEVE NEW MEASURED DATA FROM MACHINE

2000 CONTINUE

CALL READMEAS

CALL PDQINIT(2)        !INITIALIZE FROM 2 ON

```
    ELSE IF (MCHOICE.EQ.2) THEN
        USER WANTS TO RETRIEVE OLD MEASURED DATA FROM
        FILE

3000 CONTINUE
        CALL READMEAS
        CALL PDQINIT(2)        !INITIALIZE FROM 2 ON

ELSE IF (MCHOICE.EQ.3) THEN
        USER WANTS TO ANALYZE RETRIEVED MEASURED DATA

4000 CONTINUE
        CALL PROCMEAS
        CALL PDQINIT(2)        !INITIALIZE FROM 2 ON

ELSE IF (MCHOICE.EQ.4) THEN
        USER WANTS TO DELETE ALL MEASURED DATA

5000 CONTINUE
    CALL DELMDATA
    END IF
END DO
SET UP PDQCON(2) TO RETURN TO THIS ROUTINE ON CLINKS

9999 CONTINUE

ERROR REQUESTED TO SKIP OVER REST OF ROUTINE

GO TO CIG MAIN MENUS CX190
```

```
INITIALIZE PDQCON

CALL PDQINIT(2)

SET PDQCON(1) SO WE ASK FOR MAIN CIG MENUS IN CX190

CALL CLINK(PDQMOD)

END
```

With reference now to the data flow diagram of FIG. 10 of the drawings, structure is shown in which the CIG modules execute. The user or operator interacts with the CIG system through one or more input/output devices are represented by the user I/O device 30 in FIG. 10. This device can be any interactive graphics terminal which can display, manipulate and identify three dimensional wire frame images as well as alpha numeric text. The drivers for the I/O devices and associated software routines are provided by a CAD data base generator shown at 31. A CIG I/O processor, seen at 32 in FIG. 10, is a further link in the interaction between a user and the CIG system. Interaction between a user and the CIG system is provided by the CAD data base generator 31 of FIG. 10, as well. Such interaction is exemplified by I/O processor performance of the functions of the selecting individual CIG modules, entering numbers through a keyboard or by picking or selecting geometry, needed as input for the creation of a gage. The CAD data base generator capabilities are actually used in creating the gage graphics, but the CIG I/O processor creates the commands to activate appropriate CIG system routines and to retrieve data from the data base. An interface specification is provided to the CAD vendor who uses it to write subroutines which allow the CAD data base generator to plug directly into the CIG system. The routines resulting from the interface specification provide the means by which the CIG system gets data from the user and by which it presents information back to the user.

Information (data) is exchanged throughout the CIG system in one of the following ways as seen in FIG. 10.
1. Intermodule communication is achieved through the CIG main data base 33.
2. Inspection, analysis and statistical results are written to and read from the input/output files 34.
3. Positional data is sent to and read from various electro-mechanical inspection devices, such as coordinate measuring machines, vision systems, numerical control machine tools and laser range finding devices represented at 35 in FIG. 10.

The CAD data base generator 31 of FIG. 10, is essential to many of the CIG system operations providing 3D CAD geometry as input. In addition, many of the CIG system operations create and display 3D CAD geometry as output. The CIG system was designed so that a CAD data base generator (i.e., Anvil-4000®, Unigraphics®, CADAM®) could be "plugged into the system. The CAD data base generator allows the user to generate basic 3D geometry and allows the CIG system to use the intrinsic CAD functions to create and display CAD geometry as needed. Through the CAD system, the CIG system performs the basic I/O functions of terminal display driving, menu display and data entry. Since CIG operates using many of the capabilities of the CAD system, users interacting with the CIG system may not realize at any point in time whether they are operating the CAD vendor's software or they are executing the CIG system software.

A more detailed description of each of the five CIG modules hereinbefore described will now be undertaken. The data flow diagram of FIG. 10 shows the five modules as follows: the gage module 36, the inspection module 37, the analysis module 38, the job control module 39, and the tolerance module 40. Description will hereinafter proceed for each module including:

1. The module inputs.
2. How the module works; what it does, and what algorithms are used.
3. The module outputs.

A description of the gage module 36 of FIG. 10 begins with reference to the inputs for the module. Inputs include drafting notes and three dimensional geometry. The drafting notes are those depicted in FIG. 11 which is a chart taken from the American National Standard for Dimensioning and Tolerancing, ANSI Y14.5M, together with plus and minus dimensioning. The plus and minus dimensioning is considered to be all dimensioning outside of the geometric tolarancing of ANSI Y14.5M. The three dimensional geometry is obtained from the CAD data base generator 31 plugged into the CIGMA system.

The gage module 36, besides asking for three dimensional geometric information from the CAD data base 31, also asks for drafting note information from the data base for the purpose of establishing tolerances. The CIG software asks for the information in a specific sequence as represented by a menu displayed to the user. The menu prompts the user to initially define the datums on the three dimensional geometric display of the part to be dimensioned. Datum definition involves assigning a symbol to the datum (plane, hole, etc.) and then identifying the datum feature by designating the feature of the program; i.e., identifying the edges and the location of a datum plane. The CIG system understands the ANSI Y14.5M drafting text. Therefore, the datums are further defined by the four form characteristics (straightness, flatness, circularity or roundness, and cylindricity) seen in FIG. 11. The tolerances on the form characteristics assigned to the datums, as hereinbefore described, must never be allowed to be greater than about ten percent of the tolerance allowed on the other part features which are referred to the datums. For example, if a location tolerance of another part feature is 0.006, the flatness tolerance of a plane used as a datum must be no more than 0.0006.

The CIG system understands all of the other drafting text of FIG. 11 which may be assigned to the various part features. Simultaneously with the input of drafting text to the CIG system, syntax checks are taking place, definitive examples of which will be presented hereinafter.

Profile tolerances, orientation tolerances, location tolerances and runout tolerances (FIG. 11) are all determined with respect to one or more datums. When specifying these tolerances one or more datums need to be referenced in the feature control symbol. An example of a feature control symbol as it appears on a drawing depicting a part is as follows:

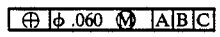

The foregoing is expressed to the CIG system by the user as: TP, CZ 0.060 M, A, B, C. In this example, the positional tolerance of 0.060 must be considered with respect to three datums, A, B and C. The datums referenced by these feature control symbols, serve to define the functional requirement of the features being controlled. This means that the degrees of freedom of the controlled feature are defined. Examples of the application of datums to a part having certain controlled features may be seen with reference to the controlled part 41 of FIG. 12. A number of datums are depicted in FIG. 12 as shown on the part 41 designated A through E, and a number of part features are also shown. Part 41 has a rectangular solid base with similar length and width dimensions and a smaller height dimension. The upper surface 42 of the base is designated datum A. Part 41 also has four similar bosses 43 extending upwardly from datum A and a fifth boss 44 designated datum E. One vertical side of the base is designated datum C as shown. Another vertical side is designated datum B as shown. A hole 46 centrally located in the base 42 is designated datum D.

FIGS. 13A, B and C are chart diagrams of gages which the CIG system can construct for checking various features of the part 41 of FIG. 12. Each of the FIGS. 13A-C has four columns a, b, c and d and four horizontal rows e, f, g and h. It may be seen that if a gage seen at FIG. 13A, a, e for the four bosses 43 of the part 41 is constructed using only datum A in the geometric tolerances, then the gage will have four holes 47 and the dimension will have three remaining degrees of freedom in the X translational direction (XTT), the Y translational direction (YTT), and the Z rotational direction (ZTR). Reference only to the A datum does not tie the pattern bosses 43 down in the X or Y translational directions, nor in the Z rotational direction. The remaining gages of FIGS. 13A, B and C have indications of the datums applied to the geometric dimensioning of the part 41, and indicate the remaining degrees of freedom as a result of that geometric dimensioning. Sometimes the datum indications also contain modifying symbols such as Ⓜ (maximum material condition) and Ⓢ (regardless of feature size) which have an effect on the remaining degrees of freedom as will hereinafter be described.

The CIG system automatically determines what the functional requirement of a given set of features are. The system then displays this functionality by generating a three dimensional model of the worst case mating part, sometimes called a functional gage, a number of which are seen in FIGS. 13A, B and C. The CIG system determines the underlying functionality for any set of datums and modifying symbols in a particular order or precedence by applying the following rules.

With reference to FIG. 13A, gages are shown for inspection of various features of the part 41 of FIG. 12 where the datum referenced for geometric tolerancing is a plane. If the datum referenced is the primary datum, the CIG system forces three points of contact between this datum and the mating part. If the datum referenced is the secondary datum, the CIG system forces two points of contact between this datum and the mating part. If the datum referenced is the tertiary datum, the CIG system forces one point of contact between this datum and the mating part. The primary, secondary and tertiary datums are the first, second and third datum symbols respectively to appear in the feature control block. They appear in the right-hand end of the feature control block as seen in the gage charts of FIGS. 13A through 13C.

If the datum referenced in the feature control block is a datum feature of size, such as a hole or a boss, then the gages of FIGS. 13B and 13C apply. If the material condition referenced is at maximum material condition (MMC or Ⓜ ) as seen in FIG. 13B, then if the datum is the primary datum, the CIG system forces the axis of the mating part to be parallel to the axis of this datum in three dimensions. If the datum is the secondary datum, then the CIG system forces the mating part feature to fall within this datum if the datum is a hole or to totally surround the datum if the datum is a boss. Similarly, if the datum is a tertiary datum then the CIG system forces the mating part feature to fall within this datum if the datum is a hole, or to totally surround the datum if the datum is the boss.

Alternatively if the material condition referenced is at "regardless of feature size (RFS or Ⓢ as seen in FIG. 13C) then if the reference datum is the primary datum, the CIG system forces the axis of the mating part to be parallel to the axis of this datum in three dimensions, and prevents the mating feature from translating within this datum. In other words, the mating feature is simulated by a tapered pin on an axial compression spring which forces the mating feature to take up space between itself and the datum. This may be seen in FIG. 13C where a tapered pin 48 is shown constructed on the gage depictions when the datum D (centrally located hole 46) of the part 41 of FIG. 12 is used in the feature control block. This may be contrasted with the boss 49 shown on the gages of FIG. 13B where the MMC symbol Ⓜ is used.

Remaining with FIG. 13C wherein the RFS or Ⓢ call-out is used, if the datum to which the material condition applies is the secondary datum, then the CIG system forces the mating part feature to fall within the datum if the datum is a hole or to totally surround the datum is a boss. As explained for the primary datum in this case hereinbefore, this prevents the mating feature on the gage (FIG. 13C) from translating within the datum, in this case datum D on part 41 of FIG. 12. In like fashion, if the datum to which regardless of feature size condition applies is the tertiary datum, then the CIG system forces the mating part feature to fall within the datum if the datum is a hole or to totally surround the datum if the datum is a boss. As with the primary and secondary datums, such a material condition assigned to a tertiary datum prevents the mating gage feature, tapered pin 48 on the gages of FIG. 13C, from translating within the datum, D on the part 41 of FIG. 12 in this example.

When datums are referenced in a feature control block, the foregoing rules can be applied to determine the precise functionality of the mating part with respect to the features being controlled. If the primary datum is a plane, then if the feature control block appears as true position, diameter, 0.060 Ⓜ A, where datum A is a plane, then physically this plane A controls the orientation of the mating part. What that means is, the mating part must make contact on the three high points of the plane A referenced as the primary datum, and the mating surface will be allowed to translate and rotate, but will be constrained to remain coplanar to the datum surface A. An example of such a dimensioning result may be seen in FIG. 13A, g, a which depicts a mating part (gage in this instance) for the part 41 and which may translate in the XT and YT directions and may rotate about the ZTX. It may also be seen that for a feature control block call-out of true position, diameter 0.060 datum A, where A is a plane, the mating part or gage of FIG. 13A, e, a applies which allows translation of the mating part relative to the part 41 of FIG. 12 in the XT and YT directions and rotation about the ZT access. Mathematically the datum A reduces the amount of allowable motion from a totally uncontrolled motion (three directions of plus and minus translation and three directions of plus and minus rotation) to three degrees of freedom, translation along XT and YT and rotation about ZT.

If the primary datum is a hole or a boss, the symbols Ⓜ or Ⓢ are used as hereinbefore described. If the material condition specified on the primary datum is at MMC ( Ⓜ ) the feature control block might look as follows:

| ⊕ | ⌀ .060 Ⓜ | D |

In the foregoing the hole 46, shown as datum D in FIG. 12, physically controls the orientation of the mating part for the part 41. The axis of the mating part is forced to be parallel to the axis of the datum hole D. Similarly, the pin 49 on the gage of FIG. 13B, e, a is forced to be parallel to the axis of the datum hole D. Once the datum and the mating part (or the gage) are oriented correctly, the mating features are allowed to translate and rotate within the datums where they are holes such as D, and to surround the datums and translate and rotate around the datums where they are bosses. Geometrically the mating part is allowed to translate along the XT and YT axes, and to rotate about the ZT axis as seen in FIG. 13B, f, a, for example. However, the mating part is always held within the datum for datum holes (D) or is always held surrounding the datum for datum bosses (E). Mathematically datum D reduces the amount of allowable motion from six degrees of freedom, affording no control at all, to three degrees of freedom. Additionally, a datum hole or boss limits the amount of XT and YT translation by the amount of the deviation between the datum feature and the mating part feature.

If the material condition on the primary datum is at RFS, seen as Ⓢ, then the feature control block would appear as

| ⊕ | ⌀ .060 Ⓢ | D |, where D is a hole or boss. In the examples set forth herein, datum D is a hole as seen in FIG. 12. Physically the hole 46 controls the orientation of the mating part by forcing the axis of the mating part to be parallel to the axis of the datum hole (or boss). Once the datum and the mating part are oriented correctly, the mating feature is only allowed to rotate about the axis established by the datum. No translation is allowed as with the MMC modifier Ⓜ hereinbefore described. This is illustrated in FIG. 13C, e, a wherein rotation about the ZT axis only is allowed. Thus, the RFS feature specification, in this instance, mathematically reduces the amount of allowable motion between the part 41 and its mating part from an uncontrolled six degrees of freedom condition to a single degree of freedom condition ZTR.

The CIG system checks the syntax of the ANSI standard dimension call-outs as mentioned hereinbefore. Referring to FIG. 14, a machined part 54 is depicted having an array of 7 holes indicated at 56. As seen in FIG. 14 the datum B is a lip or boss on the part 54. Referring to the box call-out, it may be seen that datum B is not modified by either a maximum material condition Ⓜ or a regardless of feature size Ⓢ symbol. This is error since the condition of the boss is not defined completely without one such call-out and it cannot therefore be a useful datum. The same would hold if B was a datum hole. The box must therefore appear as

| ⊕ | ⌀0 Ⓜ | D | B Ⓢ | F |.

The system recognizes the error, indicates it on the system display and prompts the user to correct the tolerance call-out to appear in the aforementioned proper form.

With reference to FIG. 15, an ANSI standard call-out is shown for two threaded holes 57 in the part 54 wherein the hole diameters are toleranced at maximum material conditions. While this is not outright error from the standpoint of the tolerance standards, the holes are threaded and the Ⓜ call-out would require measurement of the thread peaks and the thread roots for conformance. This is clearly impractical from both a measurement and a use standpoint. The generated system inspection gage will not recognize the maximum material call-out. All that is needed is proper positioning of the fixed fastener which will engage the threads. The system therefore displays a warning that the system inspection gage will be generated at "regardless of feature size" and prompts the user to substitute Ⓢ for Ⓜ at the hole diameter true position tolerance.

The gages of FIGS. 13A–C are shown on the system display with an XYZ coordinate system and only depict the controlled features on the part they are constructed to mathematically inspect. That is why the relatively simple call-out which references only datum A for the part 41 of FIG. 12 causes the CIGMA system to construct a relatively simple gage as seen in FIG. 13A, e, a. The gage just mentioned consists only of four holes 47 in the datum plane A. It may be seen that the more restrictive call-out of FIG. 13A, h, d, uses as datums the plane A, the hole D and the boss E of the part 41 in FIG. 12. Therefore, the holes 47 appear together with the tapered pin 48 (because the datum D is modified by the RFS symbol Ⓢ), and a tapered hole 51 (because the datum boss E is also modified by the RFS symbol). The gage for feature control call-outs for primary, secondary and tertiary planes A, B and C is shown in FIG. 13A, f, b, wherein flanges 52 and 53 are provided on the gage for forced contact with datums C and B respectively. A coordinate system is also displayed with each of the gages of FIGS. 13A–C displaying the three axes along which translation and about which rotation may be made in accordance with remaining degrees of freedom (DF) after tolerancing.

A description of the functions of the inspection module 37 of FIG. 10 will now be undertaken. The inspection gages of FIGS. 13A–13C are stored in the computer as hereinbefore described in conjunction with the description of the gage module 36. A three dimensional CAD presentation of the part to be inspected is also resident in the computer. The computer is aware of the part shape so that it may generate a convenient inspection path. The sensor configuration (probe array) will depend on the shape of the part. The cluster 22 of FIG. 5 uses standard hardware obtained from Renishaw Corporation. One type of probe 22a is a shank with a ruby tip. The sensor is pressure sensitive and is moved from point to point about the part being inspected on the robot ram.

The CIG system software now goes into an inspection path definition. There exists two options for the definition of the inspection path. In the first option, the previously defined critical and major features on the part to be inspected as represented by the stored inspection gage are used. The inspection gage, as hereinbefore described, uses the GD and T call-outs from the part drawing as they exist in the CAD presentation of the part in the computer. The software picks an appropriate tip in the cluster 22 (FIG. 5) and creates a logical path in three dimensions for inspection of the features required. The required features are those which are envisioned as critical and major in the inspection gage. Thus, in this option the inspection gage models are used to determine the inspection path.

In an alternate option for defining the inspection path, the user or operator picks the part feature to be inspected. The software, having knowledge of the cluster configuration, then designates the appropriate probe tip 22a in the cluster 22 to be used for inspection of that part feature and creates the inspection path with reference to the CAD model contained in the computer. At this point five physical part features may be selected by the user in the user definable mode of inspection path definition; i.e., threaded features, bores, bosses, planar surfaces and edges.

The inspection path may be modified in a number of ways. The user may indicate the portion of the path to be modified on the CRT screen for the system and enter new coordinates for any such path point through the system keyboard. Alternatively, a new point or coordinate may be added in the inspection path by positioning the cursor on the CRT face at the new point and entering it through a keyboard election. Additionally, inspection path points may be deleted by designating the point to be deleted by the cursor on the CRT face and electing deletion at the keyboard. Modification may also be made to the inspection path with regard to "approach distance". Every contact between a probe 22a and a part involves appropriate positioning of the probe at a nominal distance from the inspection point known as the "approach distance". After inspection the probe 22a is withdrawn through what is called a "retract distance". Both of these distances may be altered by selection at the keyboard to thereby modify the inspection path manually.

Now that the inspection path is defined, the CIG system software enters the inspection path orientation process. The location of the part is within certain bounds called the machine envelope. Some approximate predetermined orientation of the part is required within the machine envelope as depicted on the CRT screen so that the part is in an orientation approximately known. The probe cluster is moved to touch the part on certain easily reached known features of the part while the part is in such an orientation. Examples of such feature combinations which will provide orientation identification are any three planes, a plane and two holes, a plane and a cylinder with a known axis orientation, etc. Following the orientation process for the inspection path, a calibration process for the probe cluster is entered. It may be imagined that the probe cluster itself is constructed with certain tolerances on the actual location of the probe tips 22a relative to the cluster body 22. A calibration artifact is located on the inspection machine bed. The dimensions of the calibration artifact are known precisely. The probe cluster is brought over to the artifact by the machine and each probe tip is brought into contact with the artifact. With knowledge of the dimensions of the calibration artifact and the measurements as sensed by the cluster, errors are identified and compensation values are stored for subsequent application to actual inspection results.

Description of the job control module 39 seen in FIG. 10 will now be undertaken. The job control portion of the CIG system defines sequentially the steps which are desired for a specific job prior to any job execution. First the CIG sytstem is informed of the identity of a certain kind of a machine which will be attached to the system. For example, a Cincinnati numerically controlled milling machine may be attached.

ATTACH command is illustrative of job control language utilized in the system. The ATTACH command is used to connect the CIG system to the specified CMM or DNC machine. When the ATTACH command is encountered in the JOB file, the specified machine is first "connected" to the CIG system. The device name used in the computer allocation procedure must be defined by the logical name "CIG MACHINE". This is done externally to the job. For example, the LOGIN.COM procedure file might contain the following command: ASSIGN TXC3: CIG_MACHINE. Some operator instructions are given at the time the "ATTACH" is performed. These instructions are machine type dependent. When the requested actions are completed, then the job execution continues. If the machine cannot be successfully attached, then the job execution terminates. The following illustrates job control language used in conjunction with the ATTACH command.

---

FORMAT: ATTACH [machine type]
PARAMETERS: [machine type]

---

The machine type specified in the ATTACH
command may be one of the following:
CINCINNATI for cincinnati milicron 5VC
machines
DEA for the DEA CMM machine
AUTOMATIX for the AUTOMATIX laser robot CMM
SIMULATE for testing and debugging JOBS.
The simulate machine prompts for data to
simulate measured data collected from a
machine. This is useful for quality
testing the software.
ECHO for testing JOBS. The ECHO machine
echos back a perfect measurement. Useful
for verifying that a job will run
correctly when a part is made correctly.
WALDRICH for the WALDRICH COBURG machines.
QUALIFIERS:
/TOOL NUMBER=nnnn
/Tool_NUMBER specifies the tool number to be
selected during the ATTACH. If supplied, the
requested tool is loaded into the SPINDLE
when the machine is first attached. This may
be useful if the NC data file does not
contain a tool change or if the CAD model NC
tool path does not specify a TOOL to the post
processor. This option is for use on DNC/CMM
or DNC machines only. It is ignored on all
other machines.
RELATED OPERATIONS:
An ATTACH must be used before any DNC or CMM
type command can be used. If it is not used,
then a system related error will be
reported. The DISCONNECT command may be used
to free the device for use by another process.
EXAMPLE:
ATTACH/TOOL=9999 SIMULATE

---

This information with regard to the machine type attached to the system serves as a "wake-up" for the system. The system then executes the calibration process described in conjunction with the inspection module 37.

CALIBRATE is also illustrative of the system job control language. CALIBRATE is used to measure the actual geometry of a probe cluster 22 prior to use. The system requires that all probe tips 22a be calibrated before they are used to measure a part. If the exact probe geometry is known, and the design of the probe cluster in the system is exact, or if testing is desired, then a probe may be calibrated to the design values contained in the CAD system. If a previous calibration is to be used, the calibration results may be read in from a data file. The calibration table is defined as the vector from the cluster reference point to the center of the ball tip contained on each probe. The following illustrates job control language used in conjunction with the CALIBRATE command.

---

FORMAT:
CALIBRATE/DESIGN    CALIBRATE    processnumber
CALIBRATE/FILE=[filename]
CALIBRATE Process_number
PARAMETERS In this form of the CALIBRATE
command, the process number to use is given
as a parameter. This form is used when an
actual CLUSTER calibration is to be
performed. Note that the use of FILE, DESIGN
and any other qualifier is not allowed (i.e.,
there are three different forms of the
calibrate command.)
QUALIFIERS:
/OUTPUT_FILE=[file_name] The calibration
results are stored in the file specified.
This file may be read in later by the CIG
system to calibrate a probe rather than using
machine time to calibrate the probe.
/MAXTIPERR=[real_value]. The MAXTIPERR value
is used to control how far from design the
top of each probe calibrated may be. Each
tip location relative to the design location
is checked to see if it is within this MAXTIP
ERR of the design location. If the error
exceeds this value, the CIG system
terminates with an error. If the MAXTIP_ERR
qualifier is not specified, or if the value
specified is 0.0, then no check is made.
/MAXRADERR=[real_value]. The MAXRAD_ERR
value is used to control how far off of
design the radius of the ball tip may be from
the design value. If this value is not
specified, then no checks are made.
MAX_VARIATION. This is used to control what
the maximum deviation of computed probe tips
can be. The calibration process generates
five points around a sphere 10 (Figure 1) to
calibrate each tip. This results in five
computed diameters for each sphere tip.
These values are averaged. If the deviation
from the average for any probe tip exceeds
MAX_VARIATION, then the CIG system terminates with an
error message. /TOOL=[tool number] If /TOOL
is given, then the specified tool is loaded
into the spindle before the calibration
process is executed.
CALIBRATE/DESIGN. There are no other
parameters or qualifiers used with this form
of the CALIBRATE command. This command
specifies that the design of the PROBE
CLUSTER is to be used to calibrate the
cluster.
CALIBRATE/FILE=[file_name]. There are no
other parameters or qualifiers used with this
form of the CALIBRATE command. This command
specifies that the calibration is to be read
in from a calibration file. NOTE: the probe
cluster name is contained in the calibration
file, and must match the probe cluster that
is to be used in the operation of the machine
during the inspection operations that follow.
RELATED OPERATIONS:
The ORIENT and INSPECT commands rely on the
cluster calibration. If an INSPECT or ORIENT
is attempted with an uncalibrated probe, an
error message is given and the CIG system
terminates. If an INSPECT or ORIENT uses a
different CLUSTER than the CLUSTER that was
calibrated previously, then an error message
is generated, and the CIG system terminates.
EXAMPLE:
CALIBRATE/DESIGN
CALIBRATE/FILE=STAR_CLUSTER.CAL
CALIBRATE/OUTPUT=START_CLUSTER.CAL/MAXTIP
ERR=.0001 901

---

Following execution of the calibrate command in job control, a point is found on the CAD model stored in the computer by aligning the cursor crosshairs manually on the desired point on the CAD model. A corner is a useful point for manual designation because it is easier to align the cursor accurately thereon. The CAD depiction of the orientation of the part for which the job control sequence is being generated is shown on the CRT. Thereafter, the orientation process described in conjunction with the inspection module is run. The orientation process may be for alternate uses. The job may relate to machining new features on a part or to inspecting machined features. It is possible to perform either of these functions from the initially defined datums. Moreover, in some instances it may be desirable to machine new features followed immediately by inspection of the newly machined features from the aforementioned datums. In this fashion a part may be literally built step-by-step and inspected step-by-step with reference to the datums contained in the CAD model and the inspection gages hereinbefore described.

Having run the inspection process in a step wise make-inspect manner or for the entire manufactured part all at once, or any combination thereof, job control now turns to analysis of the inspection results. Analysis proceeds for simulation in the fashion to be described hereinafter for the analysis module 38. Subsequent to the analysis step in the job control definition a command is given to detach the machine and the system is turned off.

Other functions are sprinkled throughout the generation of the job control sequence which may be required during any specific job. Certain displays may be provided for specific purposes during the running of a job. Operator messages may be provided which are specific to that job. When all of the foregoing is accomplished including the other or special functions for a particular job, that job control is simulated by executing the job sequence in a fashion so that it may be observed by the operator who has just generated the job control sequence. When the operator is satisfied through observation of the sequence, job control may thereafter be called up by the operator at will.

In the actual performance of job control in the shop the identification of the attached machine provides information to the CIG system software with regard to the tools available and/or the inspection devices available. The operator then selects "Run the job" and the calibration process is entered for the cluster probes as hereinbefore described. The designated point for orientation on the part after it has been approximately oriented in accordance with the CRT depiction of the part flashes on the CRT screen and the operator goes to that corresponding point on the part manually with the probe. Run orientation is entered and the CIG system software takes control back from the operator. The predetermined part features as designated by the job control are thereafter manufactured on the part if that is included in this job control and/or the inspection of those manufactured features ensues. The results of the inspection are taken into the computer data, and analysis, to be hereinafter described, is run by the analysis module 38 of FIG. 10. At the end of the job control sequence the command to detach the machine is entered and the process is turned off.

The analysis module 38 of FIG. 10 to which reference was made hereinbefore will now be described. Two functions are performed by the analysis module, gage analysis and statistical process control (SPC) analysis. These analyses may be provided simultaneously or separately by the system. Gage analysis will be described wherein the query is "Is this part alright?". The gages that apply are designated by the job control routine. The gages are placed on the part as constructed by the inspection results and the system attempts to fit the gages through the allowable degrees of gage freedom to the inspected part. If the gage fits, inspection is complete. If the gage does not fit, analysis is undertaken for rework capability. If it is determined, as hereinbefore described that rework is possible, the manner in which such rework may be undertaken is communicated to the operator. If the gage does not fit, no rework is possible and the machine is detached and that job is shut down.

With regard to statistical process control analysis, the query is "Is the machine tool making parts the way they were made in the past when they were acceptable?". A record of inspection quantities for each inspected feature on each part is kept in the system file. This record provides a distribution which is contained within the defined part tolerances for the population which has been inspected. This population is used as a reference for the same features inspected on parts thereafter. A normal distribution, within which plus or minus three sigma is acceptable (99.7% of the population), is thereby defined within the defined part tolerances. When one inspected feature goes outside the plus or minus three sigma range (3 out of 1,000), an out of control flag comes up for that process. This occurs even though the part may still be within the part feature tolerances. An investigation is immediately entered. Possible causes of the maverick point outside the plus or minus three sigma range may be due to a number of causes. These causes include a new operator, a loose fixture, bad/wrong materials, a worn out tool, etc. Something is changed to correct the out of control condition. About five parts are made by the process thereafter and if all are good, the process is considered to be back in control and is continued. If one or more of the five parts are bad, the investigation is continued.

When an out of control process indication is made, the operator can recall some depiction of the historical data. He may call up a run chart which shows how that specific manufactured feature is appearing as a result of the inspection process or he may call up what is called a X-Bar Chart which is a depiction of the mean of the inspection samples. Alternatively, an R-Chart may be called up which depicts the range of inspection points for that feature in that run. With this information the operator is better equipped to designate one of the potential sources hereinbefore mentioned for the out of control condition. Thus, an intelligent means is provided for making the aforementioned change to the process prior to running the five part sample to determine if the process is back in control.

The tolerance module 40 of FIG. 10 will now be described. The tolerance module is written in the CIG system for use by design engineers as opposed to quality control or process engineers. Two separate functions are performed by the tolerance module, the first of which is the less complex function. It has long been recognized that it is difficult for the design engineer to design two mating parts with tolerancing on the part features which will guarantee assembly without interference for any condition of the two parts within the recited part tolerances. Often one engineer designs and tolerances one part while another engineer designs and tolerances the mating part. The CIG system takes in data descriptive of each of two mating parts together with the tolerancing according to the ANSI standard and investigates assembly of the parts if the worst case tolerances for part assembly exist at each part. The CIG system also checks whether one of the mating parts is described with the correct GD and T dimension and tolerance description relative to the GD and T part description of the mating part. In this fashion the mating parts may be identified with regard to (1) potential material interference, and (2) datum definition inconsistencies between the parts. In summary, the first function of the tolerance module checks tolerance values which have already been called out by the design engineer or engineers and indicates to the system user if there is potential material interference of if there is inconsistency in the datum call-outs which would allow an otherwise correctly toleranced mating part to achieve a "within tolerance" but "no fit" condition.

The second function of the tolerance module 40 in FIG. 10 is performance of fixed and floating fastener analysis. A high percentage of tolerances on mechanical drawings are there to show the location of features which function to hold parts together with fasteners. It should be noted that a fixed fastener is represented by a threaded bolt which passes through a clearance hole in one part and engages a threaded hole in a mating part. A floating fastener is represented by a bolt which passes through a clearance hole in one part and a corresponding clearance hole in the mating part, and serves to fasten the two parts together by means of a nut, for example, applied to the threads of the fastener on the opposite side of the mating part. This second tolerance module function serves to create the tolerance values to be called out by the design engineer on the drawings for the part and the mating part.

The procedure undertaken by the user in performing floating fastener analysis in the second function of the tolerance module involves initially choosing a fastener to be used. Fasteners are described having standard body diameters and head sizes (on bolts, for example) which describe defined bearing areas on the underside of the bolt head. Such fastener descriptions may be obtained from mechanical engineering tables. The user then designates the positions on a part where the selected fasteners are to be used. This is done by placing a cursor at a fastening point on a displayed depiction of the part and entering the information through the keyboard, as hereinbefore described for other functions of the CIG system. The user now designates the datums on the displayed part which are to be utilized in locating the features on the part, such as holes, where the fasteners will be placed and enters the datums into the system. The CIG system now computes the optimum size of the holes for the fastener and the true position of the holes on the mating part while the system simultaneously investigates the CAD models of the part and the mating part stored therein. Upper and lower optimum hole sizes for the holes in both parts are computed such that all the bearing surface of a fastener bolt head is in contact with the surface of the part through which it extends. It may be recognized that it is detrimental to the design of the assembly if holes in a part receiving a fastener are so large as to extend outside the dimensions of the holding portion of the fastener (the bolt head).

The CIG system also takes into consideration the characteristics of the tool to be used to create the part feature. For example, a drill as it wears out will make a larger hole and mechanical engineering tables provide an indication of the magnitude of such enlargement. A 0.593 diameter drill bit, for example, will never create a hole over 0.625 diameter even when the drill bit reaches a dull condition. The CIG system, knowing these facts, uses them to tolerance the part and the mating part.

By way of example of the hole tolerance generation by the CIG system for floating fasteners, reference is made to FIG. 16 wherein a part 57 is shown having four clearance holes 58 therethrough. In this example a bolt having a 0.500 body diameter and a 0.750 head size is chosen by the design engineer to fasten part 57 to a mating part 59 also having four clearance holes 61 therethrough. If the holes 58 never exceed 0.625, the bearing surface of the bolt head will cover the holes 58. A 0.593 drill, incapable of drilling a hole larger than 0.625 as mentioned hereinbefore, is selected and the four holes are called out at 0.593 diameter plus 0.032, which allows a maximum hole size of 0.625. The minimum hole size is the difference between 0.593 and the bolt body diameter, whereby the minus tolerance on the hole becomes 0.093 so that the hole may never be less than 0.500. The ANSI standard call-out therefore appears as true position, diameter, zero tolerance at maximum material conditions relative to datum A (the top face of part 57) as seen in FIG. 16.

When the CIG system is advised that a fixed fastener is being toleranced with regard to the mating parts, the user inputs are as designated hereinbefore when tolerancing for a floating fastener. Additionally, the CIG system asks for the thickness of the part containing the clearance holes and the mating part containing a corresponding pattern of threaded holes as hereinbefore described. In this instance the member containing the clearance holes will have a clearance hole tolerance on the plus side which is the same as for the floating fastener analysis, but the negative tolerance on the clearance holes will be diminished, because the fastener when fixed in the threaded portion of the part containing the threaded holes clearly cannot move. The clearance holes in the floating part must therefore be more tightly controlled. The CIG system recognizes this necessity during fixed fastener analysis and, for purposes of comparison, the tolerance on the holes 61 in part 59 of FIG. 16 presuming they are for this example threaded holes for receiving the fastener, would be 0.062 at maximum material conditions where the thickness of the part 57 is taken into consideration. The ANSI call-out for the four threaded holes 61 of FIG. 16 would therefore appear as follows:

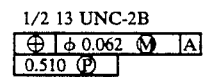

The following is an abbreviated program listing depicting one manner in which a program may be formulated for operating the disclosed system in performing the disclosed analyses, job control and tolerance module processes. © FMC Corporation 1987.

```
C
            SUBROUTINE SPC_DRIVER
C
C       Purpose: To provide overall control for Statistical Process
C                Control option.
C
C
C       Begin execution.
C
C       Loop to process menu choices from user.
C
            DO WHILE ( .NOT. TERMINATE )
                IF ( MENULEVEL .EQ. 1 ) THEN
C
C                   Get user to choose type of Statistical Process Control
C                   activity from menu.
C
                    CALL CIG_ENTR_CHOICE ( PRIMSG , NBMENU , TXMENU ,
     &                  CHOICE , REJECT , ACCEPT )
C
C                   Set option flags, based on user's entry.
C
                    IF ( REJECT .OR. ACCEPT ) THEN
                    ELSE
                    END IF
                ELSE IF ( MENULEVEL .EQ. 2 ) THEN
                    IF ( CHOICE .EQ. 1 ) THEN
C
C                       User chose menu item one, Statistical Process Control
C                       Analysis.
C
                        CALL SPC_ANALYSIS
                    ELSE IF ( CHOICE .EQ. 2 ) THEN
C
C                       User chose menu item two, Statistical Process Control
C                       Database Management.
C
                        CALL DISPLAY_MSG ( 1 , 2 , .TRUE. , ACCEPT )
                    ELSE
C
C                       Some sort of error occurred in menu processing.
C
                    END IF
                ELSE
                END IF
            END DO
            END
C
            SUBROUTINE SPC_ANALYSIS
C
C       Purpose: To perform analysis for Statistical Process Control.
C
C       Begin execution.
C
C       Sort the Statistical Process Control data file by ascending
C       entity pointer and within each pointer by ascending date and
C       time of machining.  Terminate if sort is unsuccessful.
```

```
C              CALL SPC_SORT ( TERMINATE )
C
C        Loop to process menu choices from user.
C
               DO WHILE ( .NOT. TERMINATE )
                  IF ( MENULEVEL .EQ. 1 ) THEN
C
C                    Get user to enter boundary conditions for Statistical
C                    Process Control analysis.
C
                     CALL CIG_ENTR_TEXT ( NBPRIM , PRIMSG ,
     &                   NBMENU , ANSWER , PROMPT , REJECT , ACCEPT )
C
C                    Check dates and convert to format used to select records
C                    from Statistical Process Control data file.
C
                     IF ( .NOT. REJECT ) CALL SPC_DATE ( ANSWER ( 1 ) ,
     &                   PROMPT ( 1 ) , USRINP ( 1 ) , REJECT )
                     IF ( .NOT. REJECT ) CALL SPC_DATE ( ANSWER ( 2 ) ,
     &                   PROMPT ( 2 ) , USRINP ( 2 ) , REJECT )
C
C                    Set flags for further processing based on user's response.
C
                     IF ( REJECT ) THEN
                     ELSE
                     END IF
                  ELSE IF ( MENULEVEL .EQ. 2 ) THEN
C
C                    Get user to enter the number of observations per sample and
C                    the number of samples to be used in control line calculation.
C
                     CALL CIG_ENTR_DATA ( PRMSOS , NBOSMN , OSMENU , OSTYPS ,
     &                   NBSAMP , RNBSMP , REJECT , ACCEPT )
                     IF ( REJECT ) THEN
C
C                       Go back to previous menu level.
C
                     ELSE IF ( ( NBSAMP ( 1 ) .LT.  2 )
     &                   .OR.  ( NBSAMP ( 1 ) .GT. 25 )
     &                   .OR.  ( NBSAMP ( 2 ) .LT.  1 ) ) THEN
C
C                       Get user to try again.
C
                        CALL DISPLAY_MSG ( NBOSER , OSERMS , 2 ,
     &                      .TRUE. , ACCEPT )
                     ELSE
C
C                       Go on to next menu level.
C
                     END IF
                  ELSE IF ( MENULEVEL .EQ. 3 ) THEN
C
C                    Get user to select an entity for Statistical
C                    Process Control analysis.
C
                     CALL PICK_ONE_ENTITY ( ENTYPE , PICMSG , ENTPTR ,
     &                   REJECT , ACCEPT )
C
C                    Set flags for further processing based on user's response.
C
```

```
              IF ( REJECT .OR. ACCEPT ) THEN
              ELSE
              END IF
          ELSE
C
C             The user has entered boundary conditions and selected
C             an entity for Statistical Process Control analysis, so
C             do the necessary calculations and display the results.
C
              CALL SPC_CALCULATIONS ( USRINP , NBSAMP , ENTPTR ,
     &            ENTYPE )
C
C             Go back to previous menu level and see if user wants
C             to do the analysis again for another entity.
C
          END IF
      END DO
      END
C
      SUBROUTINE TOLANALYSIS
C
C     Purpose: This is the driver for Tolerance Analysis.
C
C     Begin execution
C
C     Present the Tolerance Analysis menu to the user, and
C     perform the requested function, until the user says he
C     is finished.
C
      GOTO (1000), GET_CIGCON(2)
C
      DO WHILE (.NOT. TERMINATE)
          CALL CIG_ENTR_CHOICE (PRIMARY, MENLINES, MENU, RESPONSE,
     &                          REJECT, ACCEPT)
C
          IF (REJECT .OR. ACCEPT) THEN
C
C             We're finished here - return to main CIG menu
C
C
          ELSE IF (RESPONSE .EQ. 1) THEN
C
C             Floating Fastener Analysis
C
C
          ELSE IF (RESPONSE .EQ. 2) THEN
C
C             Fixed Fastener Analysis
C
C
          ELSE
C
C             Worst Case Assembly Analysis
C
              CALL SET_CIGCON(2,1)
 1000         CONTINUE
              CALL WORSTCASE
C
```

```
              END IF
           END DO
C
           END
C
           SUBROUTINE WORSTCASE
C
C          Purpose: This is the driver for the Worst Case Analysis.
C
C          Begin execution
C
C          Present the Worst Case Assembly Analysis menu to the user, and
C          perform the requested function, until the user says he
C          is finished.
C
           GOTO (1000), GET_CIGCON(3)
C
           DO WHILE (.NOT. TERMINATE)
              CALL CIG_ENTR_CHOICE (PRIMARY, MENLINES, MENU, RESPONSE,
          &                         REJECT, ACCEPT)
C
              IF (REJECT .OR. ACCEPT) THEN
C
C                We're finished here - return to previous menu
C
C
              ELSE IF (RESPONSE .EQ. 1) THEN
C
C                Merge in Mating Part
C
                 CALL MERGEMATE (PARTMERGED)
C
              ELSE IF (RESPONSE .EQ. 2) THEN
C
C                Perform Worst Case Analysis
C
                 CALL SET_CIGCON(3,1)
 1000            CONTINUE
                 CALL WCANALYSIS (PARTMERGED)
C
              ELSE IF (RESPONSE .EQ. 3) THEN
C
C                Delete Worst Case Mdels
C
                 CALL DEL_WC_MODEL
C
              ELSE IF (RESPONSE .EQ. 4) THEN
C
C                Remove Mating Part
C
                 CALL REMOVEMATE (PARTMERGED)
C
              ELSE
C
C                Reposition mating part (so it's out of the way)
C
                 CALL REPOSNMATE
C
```

```
              END IF
           END DO
C
           END

CRUNJOB
C+
           SUBROUTINE RUNJOB(PDQLEVEL)
C
C       PURPOSE: TO RUN THE SPECIFIED COLLECTION OF NC TOOLING AND
C                INSPECTION OPERATIONS)
C
C       BEGIN PROCEDURE
C
           IF(PDQCON(PDQLEVEL).NE.0) THEN
              IF(JOBSEVEREERROR) THEN
C
C                 AN ERROR HAS OCCURRED - JUST TERMINATE
C
                 CLOSE (UNIT = MSUNIT)
                 CLOSE (UNIT = NCUNIT)
              END IF
           END IF
           GO TO (1000,2000,3000,4000,5000,6000,7000,8000,
       &          9000,10000,11000,12000,13000,14000,15000,
       &          16000,17000,18000,19000,20000),PDQCON(PDQLEVEL)
           DO II=1,80
           END DO
C
C       initialize fixture offsets (these values are set by manual_fixture
C
C
1000       CONTINUE
           IF(CLI_JOBNAMEPRESENT) THEN
C
C              THERE IS A JOB=NAME IN COMMAND LINE
C
C
           ELSE
              DO WHILE(.NOT.DONE)
C
C              Job being run from main menu selection "RUN JOB"
C              find out how user wants to operate
C
                 CALL CIG_ENTR_CHOICE(PRIMARY,NUMBER_OF_MENU_ITEMS,
       &                              TYPE_OF_JOB,RESPONSE,REJECT,OPCOMP)
                 IF(REJECT.OR.OPCOMP) THEN
                    ELSE
                       IF(RESPONSE.EQ.1) THEN
                          CALL CLRALPHA
                          CALL USERCHARINP('ENTER NAME OF JOB TO RUN: ',
       &                                   USERINP,OPCOMP,REJECT)
                          IF(.NOT.REJECT.AND.USERINP.NE.' ')
       &                     THEN
```

```
                          ELSE
                        END IF
                      ELSE IF(RESPONSE.EQ.2) THEN
C
C                       run job from keyboard command mode
C
C
C                       Default data to partname
C
                        CALL CIG_GET_PARTNAME(USERINP)
                      ELSE
C
C                       run job from menus
C
                        CALL CIG_GET_PARTNAME(USERINP)
                      END IF
                  END IF
              END DO
              CALL CLRALPHA
          END IF
1010      FORMAT(80A1)
          CALL REMOVE_SPACES(USERINP)
C
C         CHECK THAT THIS JOB DOESN'T ALREADY EXIST IN DATA BASE
C
C
          IF(.NOT.KEYBOARD.AND..NOT.MENU) THEN
C                                          !OPEN
              CALL CIG_OPEN_FILE (JOBUNITNUMBER,   ! unit number
     &                            USERINP,         ! user file
     &                            1,               ! status=old
     &                            0,               ! access=sequential
     &                            0,               ! carriage=list
     &                            ' ',             ! default file name
     &                            '.CJB',          ! default file ext
     &                            EDIT_FILE,       ! filespec opened
     &                            DIRECTORY,
     &                            ERROR_STATUS)
C
          IF (DIRECTORY) GOTO 1000
          IF (ERROR_STATUS) THEN
C
C             CONDITION PICKED UP AN ERROR DURING OPEN
C
              CALL FORCERESP(0,0)
              IF(GC(1).EQ.0) RETURN
              GO TO 1000
          END IF
C
          BRACK      = CHAR_POSITION (EDIT_FILE, ']') + 1
          CARAT      = CHAR_POSITION (EDIT_FILE, '>') + 1
          START      = MAX (BRACK, CARAT)
          DOT        = CHAR_POSITION (EDIT_FILE, '.') - 1
          JOBNAME    = EDIT_FILE (START:DOT)
```

```
C
              CALL CHECKJOBSYNTAX(JOBNAME,INSPECT_PRESENT,ERROR)
              IF(ERROR) THEN
              END IF
            ELSE
          END IF
          IF(INSPECT_PRESENT) THEN
C
C         AN INSPECTION WAS REQUESTED IN JOB
C
              CALL JUMPCOMON(1)
              CALL ALPHAOFF
2000          CONTINUE
              CALL GETFILES(PDQLEVEL+1,.FALSE.,.TRUE.,FIRSTTIME,
     &                      ERROR,TERMITALL)
              IF(ERROR.OR.TERMITALL) THEN
                  CLOSE (UNIT = MSUNIT)
                  CLOSE (UNIT = NCUNIT)
              END IF
          END IF
          IF(.NOT.KEYBOARD.AND..NOT.MENU) THEN
          END IF
C
          END_OF_JOB=.FALSE.
C
C         SET CURVE FONT,WEIGHT AND COLOR
C
C
C
C         Create dcs called RUNJOB on top of currently active DCS
C
          CALL CIG_CHECK_DCS_NAME('CIGJOB',EXIST,JOB_DCS_PTR)
          IF(.NOT.EXIST) THEN
            ELSE
C
C             Already exists:
C
              IF(CHECK_DCS_PTR.EQ.JOB_DCS_PTR) THEN
C
C                 Currently active dcs is CIGJOB
C
                ELSE
C
C                 Currently active dcs is not CIGJOB
C
                  CALL CIG_DEL_ENT_PTR(1,JOB_DCS_PTR,ERROR)
              END IF
          END IF
          IF(CREATE_DCS) THEN
C
C             Dcs does not exist - create on top of current DCS
C
              CALL CIG_CRE_PT_COORDS(JOB_ORIG,PT_PTRS,ERROR)
              CALL CIG_CRE_PT_COORDS(JOB_XAXIS,PT_PTRS(2),ERROR)
              CALL CIG_CRE_PT_COORDS(JOB_YAXIS,PT_PTRS(3),ERROR)
              CALL CIG_CRE_DCS_PTR(PT_PTRS,'CIGJOB',JOB_DCS_PTR,ERROR)
              IF(ERROR) THEN
              END IF
C
```

```
C         delete points used for dcs construction
C
          CALL CIG_DEL_ENT_PTR(3,PT_PTRS,ERROR)
          CALL CIG_ACTDCSPTR(JOB_DCS_PTR,ERROR)
          IF(ERROR) THEN
          END IF
      END IF
C
C     get first command in job:
C
      CALL GETNEXTJOBLINE(END_OF_JOB,FIRSTCALL,ERROR)
      DO WHILE(.NOT.END_OF_JOB.AND..NOT.ERROR)
C
3000      CONTINUE
          IF(.NOT.ERROR) THEN
C
C             FIND FIRST NON BLANK CHAR IN LINE
C
              DO WHILE(II.LT.LEN(JOBLINE)-1
     &                 .AND.JOBLINE(II:II).EQ.' ')
              END DO
C
C             DON'T PARSE LINES WHICH START WITH A COMMENT DELIMETER
C
              IF(JOBLINE.NE.' ') THEN
                  IF(JOBLINE(1:1).NE.'!') THEN
                      CALL LIB$ESTABLISH(HANDLER)
                      IF(ISTAT.EQ.229552) THEN
                          CALL LIB$SIGNAL(%VAL(ISTAT))
                          CALL WAITRESP(2)
                      ELSE IF(ISTAT.NE.196609) THEN
C                         error in parse
                          CALL WAITRESP(2)
                      ELSE !PARSE OK
                          CALL LIB$REVERT
                          CALL PDQINIT(PDQLEVEL+1)
                          CALL ALPHAOFF      !MENUS OFF
                          CALL JUMPCOMON(1)  !NORMAL JUMP/RETURNS TO ANVIL
C
C                         NOW PERFORM THE REQUESTED OPERATION
C
                          IF(JOBLINE(1:4).EQ.'DISC') THEN
C
C                             DISCONNECT THE MACHINE FROM THE COMPUTER
C
4000                          CONTINUE
                              CALL CIG_DISCONNECT_MACHINE(PDQLEVEL+1)
                          ELSE IF(JOBLINE(1:4).EQ.'NC_P') THEN
C
C                             RUN THE REQUESTED NC TOOL PATH
C
                              IF(MACHINE_CONNECTED) THEN
C
C                                 check fixtures in current dcs
C
                                  IF(.NOT.TIP_IN_FIXTURE_OFFSET)
     &                                THEN
```

```
                                CALL FIXTURES_INTO_DCS(
            &                       PROBE_LENGTH,
            &                       FIXTURE_OFFSETS,
            &                       ERROR)
                            END IF
                            IF(.NOT.ERROR) THEN
5000                            CONTINUE
                                CALL CIG_RUN_NC_PATH(PDQLEVEL+1,
            &                                        ERROR)
                            END IF
                        ELSE
5100                        FORMAT(
                            CALL FORWRITE(0,0,0)
                            CALL WAITRESP(2)
                        END IF
                    ELSE IF(JOBLINE(1:4).EQ.'NC_F') THEN
C
C                       DOWN LOAD THE REQUESTED NC FILE
C
                        IF(MACHINE_CONNECTED) THEN
C
C                           Check fixtures are in the current DCS
C
                            IF(.NOT.TIP_IN_FIXTURE_OFFSET) THEN
                                CALL FIXTURES_INTO_DCS(
            &                       PROBE_LENGTH,
            &                       FIXTURE_OFFSETS,
            &                       ERROR)
                            END IF
                            IF(.NOT.ERROR) THEN
6000                            CONTINUE
                                CALL CIG_RUN_NC_FILE(PDQLEVEL+1,
            &                                        ERROR)
                            END IF
                        ELSE
                            CALL FORWRITE(0,0,0)
                            CALL WAITRESP(2)
                        END IF
                    ELSE IF(JOBLINE(1:2).EQ.'MO') THEN
C
C                       Move machine to requested location:
C
                        IF(MACHINE_CONNECTED) THEN
                            CALL JOB_MOVE_MACHINE(ERROR)
                        ELSE
                            CALL FORWRITE(0,0,0)
                            CALL WAITRESP(2)
                        END IF
C
                    ELSE IF(JOBLINE(1:1).EQ.'I') THEN
C
C                       INSPECT THE REQUESTED INSPECTION PROCESS
C
                        IF(MACHINE_CONNECTED) THEN
                            IF(.NOT.DELETED_MEASURED_DATA) THEN
                                CALL DELMDATA(DUMMY,.TRUE.)
                            END IF
                            IF(.NOT.GOT_FILES) THEN
                                CALL JUMPCOMON(1)
                                CALL ALPHAOFF
```

```
20000         CONTINUE
              CALL GETFILES(PDQLEVEL+1,.FALSE.,
     &                      .TRUE.,FIRSTTIME,
     &                      ERROR,TERMITALL)
              IF(ERROR.OR.TERMITALL) THEN
                  CLOSE (UNIT = MSUNIT)
                  CLOSE (UNIT = NCUNIT)
              END IF
          END IF
          IF(.NOT.ERROR) THEN
7000          CONTINUE
              CALL CIG_RUN_INSPECTION(PDQLEVEL+1,
     &                      CURRENT_CLUSTER,
     &                      CLUSTER_CALIBRATION_TABLE,
     &                      FIXTURE_OFFSETS,TIP,
     &                      PROBE_LENGTH,
     &                      TIP_IN_FIXTURE_OFFSET,
     &                      ERROR)
              END IF
          ELSE
              CALL FORWRITE(0,0,0)
              CALL WAITRESP(2)
          END IF
      ELSE IF(JOBLINE(1:2).EQ.'AN') THEN
C
C     PERFORM THE ANALYSIS OF THE PART
C
8000      CONTINUE
          CALL CIG_PERFORM_ANALYSIS(PDQLEVEL+1)
      ELSE IF(JOBLINE(1:2).EQ.'AT') THEN
C
C     CONNECT TO THE SPECIFIED MACHINE
C
9000      CONTINUE
          CALL CIG_CONNECT_MACHINE(PDQLEVEL+1)
      ELSE IF(JOBLINE(1:2).EQ.'CA') THEN
C
C     RUN THE CLUSTER CALIBRATION PROCESS:
C
          IF(MACHINE_CONNECTED) THEN
              CALL JOB_CLUSTER_CALIBRATION(
     &                      CURRENT_CLUSTER,
     &                      CLUSTER_CALIBRATION_TABLE,
     &                      FIXTURE_OFFSETS,TIP,
     &                      PROBE_LENGTH,
     &                      TIP_IN_FIXTURE_OFFSET,
     &                      ERROR)
          ELSE
              CALL FORWRITE(0,0,0)
              CALL WAITRESP(2)
          END IF

ELSE IF(JOBLINE(1:2).EQ.'OR') THEN
C
C     ORIENT THE PART TO THE MACHINE
C
C         IF (MACHINE_CONNECTED) THEN
```

```
                        IF(.NOT.DELETED_MEASURED_DATA) THEN
                            CALL DELMDATA(DUMMY,.TRUE.)
                        END IF
10000                   CONTINUE
                        CALL CIG_ORIENT_PROCESS(PDQLEVEL+1,
     &                          CURRENT_CLUSTER,
     &                          CLUSTER_CALIBRATION_TABLE,
     &                          FIXTURE_OFFSETS,TIP,
     &                          PROBE_LENGTH,
     &                          TIP_IN_FIXTURE_OFFSET,
     &                          JOB_DCS_PTR,
     &                          ERROR)
                    ELSE
                        CALL FORWRITE(0,0,0)
                        CALL WAITRESP(2)
                    END IF
C
                ELSE IF(JOBLINE(1:2).EQ.'OP') THEN
C
C                   PAUSE FOR OPERATOR OK.
C
11000               CONTINUE
                    CALL CIG_PAUSE_FOR_OP_OK(PDQLEVEL+1)
C
                ELSE IF(JOBLINE(1:1).EQ.'V') THEN
C
C                   CHANGE VIEWS
C
12000               CONTINUE
                    CALL CIG_CHANGE_VIEWS(PDQLEVEL+1)
C
                ELSE IF(JOBLINE(1:2).EQ.'RE') THEN
C
C                   REPAINT THE SCREEN
C
13000               CONTINUE
                    CALL CIG_REPAINT_SCREEN(PDQLEVEL+1)
                ELSE IF(JOBLINE(1:1).EQ.'U') THEN
C
C                   UNBLANK A LEVEL
C
14000               CONTINUE
                    CALL CIG_UNBLANK_LEVEL(PDQLEVEL+1)
                ELSE IF(JOBLINE(1:1).EQ.'B') THEN
C
C                   BLANK A LEVEL
C
15000               CONTINUE
                    CALL CIG_BLANK_LEVEL(PDQLEVEL+1)
                ELSE IF(JOBLINE(1:1).EQ.'E') THEN
C
C                   EXIT THIS SESSION
C
16000               CONTINUE
                    IF(DISPLAY_JOB) THEN
                        CALL FORWRITE(0,0,0)
                        CALL CWAIT(200)
                    ELSE
                        CALL CIG_JOB_EXIT(PDQLEVEL+1)
                        END_OF_JOB=.TRUE.
```

```
                              END IF
                          ELSE IF(JOBLINE(1:1).EQ.'P') THEN
C
C                             PAUSE FOR A SPECIFIED AMOUNT OF TIME
C
17000                         CONTINUE
                              CALL CIG_PAUSE(PDQLEVEL+1)
                          ELSE IF(JOBLINE(1:4).EQ.'DISA') THEN
C
C                             DISARM THE PROBE
C
                              IF(MACHINE_CONNECTED) THEN
18000                             CONTINUE
                                  CALL CIG_DISARM_PROBE(PDQLEVEL)
                              ELSE
                                  CALL FORWRITE(0,0,0)
                                  CALL WAITRESP(2)
                              END IF
C
                          ELSE IF (JOBLINE(1:2).EQ.'MA') THEN
C
C                             PERFORM MANUAL FIXTURE
C
                              IF(MACHINE_CONNECTED) THEN
19000                             CONTINUE
                                  CALL CIG_MANUAL_FIXTURE(PDQLEVEL+1,
     &                                     FIXTURE_OFFSETS,TIP,
     &                                     PROBE_LENGTH,
     &                                     ERROR)
C
C                                 set flag to indicate that the tip
C                                 used in the fixture offset has
C                                 not been figured into the
C                                 fixture_offsets
C
                              ELSE
                                  CALL FORWRITE(0,0,0)
                                  CALL WAITRESP(2)
                              END IF
                          ELSE IF (JOBLINE(1:2).EQ.'CO') THEN
C
C                             CHANGE COORDINATES
C
                              CALL CIG_CHANGE_DCS(JOB_DCS_PTR,
     &                                            ERROR)
                          ELSE IF(JOBLINE(1:2).EQ.'TO') THEN
C
C                             DOWN LOAD TOOL TABLES
C
                              IF(MACHINE_CONNECTED) THEN
                                  CALL CIG_DOWN_LOAD_TOOL_TABLES
                              ELSE
                                  CALL FORWRITE(0,0,0)
                                  CALL WAITRESP(2)
                              END IF
C
                          ELSE IF(JOBLINE(1:1).EQ.'S') THEN
C
C                             SPAWN A COMMAND
C
```

```
              IF(ISTAT.EQ.CLI$_NEGATED) THEN
              END IF
              CALL CLI$GET_VALUE('COMMAND',COMMAND)
              IF(ISTAT.EQ.CLI$_NEGATED) THEN
                 ELSE IF(ISTAT.EQ.261401) THEN
C
C                   USER SPECIFIED AN OUTPUT FILE
C
                    CALL CLI$GET_VALUE('OUTPUT_FILE',
     &                                   OUTPUT_FILE)
              END IF
              IF(ISTAT.EQ.CLI$_NEGATED) THEN
                 ELSE IF(ISTAT.EQ.261401) THEN
C
C                   USER SPECIFIED AN OUTPUT FILE
C
                    CALL CLI$GET_VALUE('INPUT_FILE',
     &                                   INPUT_FILE)
              END IF
C
C             SPAWN THE JOB
C             NOTE: IF NOWAIT SPECIFIED, THEN THE
C             AST COMPLETION ROUTINE CALLED SPAWN_HANDLER
C             GETS CALLED
C
              IF(INPUT_FILE.EQ.' '.AND.
     &           OUTPUT_FILE.EQ.' ')
     &           THEN
C
C                SPAWN WITH NO INPUT OR OUTPUT FILES
C
                 ELSE IF(INPUT_FILE.EQ.' ') THEN
C
C                   ELSE IF INPUT FILE NULL, THEN SPAWN
C                   WITH JUST OUTPUT FILE
C
                 ELSE
C
C                   ELSE BOTH PRESENT
C
              END IF
              IF(ISTAT.NE.SS$_NORMAL) THEN
C
C                COULDN'T SPAWN - STOP THE JOB
C
20100            FORMAT('Your sub-process could not/',
                 CALL LIB$ESTABLISH(HANDLER)
                 CALL LIB$SIGNAL(%VAL(ISTAT))
                 CALL LIB$REVERT
                 CALL FORCERESP(0,0)
C
                 ELSE
C
C                   WAIT A SECOND FOR ANY OUTPUT THAT MAY BE ON S
C
                    CALL CWAIT(200)
              END IF
           ELSE
```

```
C
C                              THIS SHOULD BE IMPOSSIBLE
C
16100                          FORMAT('UNRECOGNIZED COMMAND IN JOB:/',
                               CALL FORWRITE(0,0,0)
                               CALL WAITRESP(2)
                       END IF
                   END IF
C
                   END IF
               END IF
           END IF
           IF(JOBSEVEREERROR) THEN
           END IF

IF(KEYBOARD.OR.MENU) THEN
C
C              IF KEYBOARD INPUT, THEN RESET TO NO ERROR CONDITION SO
C              ADDITIONAL COMMANDS MAY STILL BE INPUT
C
           END IF
           IF(.NOT.ERROR) THEN
               CALL GETNEXTJOBLINE(END_OF_JOB,FIRSTCALL,ERROR)
           END IF
           IF(JOBNAME.EQ.'MENU'.AND.END_OF_JOB) THEN
               GOTO 1000 !GO BACK 1 MENU LEVEL
           END IF
C
C          Check that the user did not try to change dcs:
C
           IF(.NOT.ERROR.AND..NOT.END_OF_JOB) THEN
               IF(CHECK_DCS_PTR.NE.JOB_DCS_PTR) THEN
C
C                  Job dcs was changed in middle of run:
C
                   CALL CIG_ACTDCSPTR(JOB_DCS_PTR,ERROR)
               END IF
           END IF
C
       END DO
       IF(MACHINE_CONNECTED)
      &    THEN
C
C          MACHINE WAS CONNECTED - DISCONNECT IT
C
           IF(LASTMACHINE_TYPE.NE.0) THEN
C
C              DISCONNECT DEA ONLY IF NO ERRORS WERE DETECTED
C
               IF(LASTMACHINE_TYPE.EQ.DEA_MACHINE_TYPE.AND.
      &            .NOT.ERROR) THEN
                   CALL DISCONNECTMACH(LASTMACHINE_TYPE,.TRUE.,
      &                .TRUE.,0)
               END IF
               IF(LASTMACHINE_TYPE.NE.DEA_MACHINE_TYPE) THEN
                   CALL DISCONNECTMACH(LASTMACHINE_TYPE,.TRUE.,
      &                .TRUE.,0)
               END IF
           END IF
       END IF
```

```
C
C      reactivate original dcs before entering this routine:
C
       IF(ORIG_DCS_PTR.NE.0) THEN
           CALL CIG_ACTDCSPTR(ORIG_DCS_PTR,ERROR)
           CALL CIG_DEL_ENT_PTR(1,JOB_DCS_PTR,ERROR)
       END IF
       END
```

Although the best mode contemplated for carrying out the present invention has been herein shown and described, it will be apparent that modification and variation may be made without departing from what is regarded to be the subject matter of the invention.

What is claimed is:

1. A method of inspecting a fabricated structural part to determine conformance to known part dimensional feature and tolerance call-outs using a computer coupled to a multidimensionally movable position measuring apparatus, comprising the steps of
   constructing a multidimensional model of an inspection gage using the known part dimensional feature and tolerance call-outs,
   selecting dimensional features to be inspected on the part,
   generating an inspection path relative to the part considering the dimensional features selected to be inspected, thereby defining movement of the position measuring apparatus relative to the part,
   moving the position measuring apparatus along the inspection path,
   determining the positions of the dimensional features selected for inspection on the fabricated part as the position measuring apparatus moves along the inspection path,
   constructing a multidimensional model of the fabricated structural part using the determined positions of the structural features, and
   comparing the inspection gage model with the fabricated structural part model to determine if the part is within or out of said tolerance call-outs from the comparison.

2. The method of claim 1 comprising the step of indicating if the part is reworkable or scrap if the part is determined to be out of tolerance.

3. The method of claim 1 wherein the steps of constructing multidimensional models of the gage and part comprise the steps of constructing three dimensional models.

4. The method of claim 1 wherein a display is coupled to a computer, wherein dimensioning and tolerancing standards are provided for the part dimensional features and wherein an addressable memory is available to the computer, and wherein the step of constructing a multidimensional model of an inspection gage comprises the steps of
   retrieving data from the addressable memory indicative of the known part dimensional feature and tolerance call-outs,
   displaying a model of the structural part derived from the retrieved data,
   selecting from the displayed structural part model the dimensioning and tolerancing standards applicable to part dimensional features to be inspected, and
   selecting from the model display the part dimensional features to which the standards apply, whereby data is obtained indicative of the inspection gage.

5. The method of claim 1 comprising the step of storing the constructed gage data.

6. The method of claim 1 wherein a display is coupled to the computer and wherein the step of generating an inspection path comprises the steps of
   illustrating the inspection path on the display,
   forming a path program corresponding to the illustrated path, and
   converting the path program to instructions intelligible to the movable position measuring apparatus.

7. The method of claim 6 comprising the step of storing the instructions.

8. The method of claim 1 wherein the step of moving the position measuring apparatus comprises the steps of
   detecting the structural part orientation,
   orienting the inspection path to correspond with the part orientation, and
   moving the measuring apparatus along the oriented inspection path.

9. The method of claim 1 wherein a display is coupled to the computer and wherein the step of constructing a multidimensional model of the fabricated structural part comprises the steps of
   obtaining fabricated part dimensional data from the part dimensional feature position determinations as the measuring apparatus moves along the inspection path, and
   displaying the dimensional data.

10. The method of claim 9 comprising the step of storing the fabricated part dimensional data.

11. The method of claim 1 wherein a display is coupled to the computer and wherein the step of comparing comprises the steps of
    displaying the inspection gage model and the fabricated structural part model,
    aligning the gage and part models on the display by appropriate translation and rotation, and
    detecting the fit of the gage and the part.

12. The method of claim 11 wherein the step of detecting comprises the steps of visually detecting and mathematically detecting.

13. The method of claim 1 comprising the step of ascertaining the syntactic correctness of the tolerance call-outs.

14. The method of claim 1 comprising the step of calibrating the position measuring apparatus.

15. The method of inspecting a fabricated structural part to determine conformance to known part dimensional feature and tolerance call-outs using a computer coupled to a multidimensionally movable position measuring apparatus, comprising the steps of
    constructing a multidimensional model of an inspection gage using the known part dimensional feature and tolerance call-outs,
    generating an inspection path relative to the part selected, thereby defining movement of the position measuring apparatus, moving the position measuring apparatus along the inspection path, determining the positions of the dimensional features on the fabricated part as the position measuring apparatus moves along the inspection path, constructing a multidimensional model of the fabricated structural part using the determined positions of the structural features, comparing the inspection gage model with the fabricated structural part model to determine if the part is within or out of said tolerance call-outs from the comparison and indicating if the part is reworkable or scrap if the part is determined to be out of tolerance, wherein the step of indicating if the part is reworkable comprises the steps of altering the fabricated structural part model within the known tolerance call-outs, recomparing the altered fabricated part model with the inspection gage model, and indicating that the fabricated structural part is reworkable if the gage fits the altered part model and scrap if the gage does not fit.

16. A method of inspecting a fabricated structural part having known critical and major dimensional feature and tolerance call-out data in accordance with a known geometric dimensioning and tolerancing standard, utilizing a computer connected to a display, the computer having access to the critical and major dimensional feature and tolerance call-out data for the part, and a three-dimensionally movable member carrying a position measuring apparatus operating to determine the positions of structural features on the fabricated part, comprising the steps of obtaining the computer accessible critical and major dimensions and tolerances of the part, displaying a model of the part including the critical and major dimensions and tolerances, selecting from the display the known tolerancing standard and the part dimensions to be inspected and to which the known standard pertains, forming data representative of a three-dimensional gage represented by the selected tolerancing standard and part dimensions, generating an inspection path in accordance with the selected part dimensions to be inspected, instructing the three-dimensionally movable member to follow the inspection path, measuring the position of the fabricated part features embodied by the selected part dimensions as the movable member follows the inspection path, forming data representative of a three-dimensional model of the measured fabricated part features, and determining if the gage fits the fabricated part model.

17. The method of claim 16 comprising the step of storing the three-dimensional gage and fabricated part model data.

18. The method of claim 16 comprising the step of ascertaining syntactic correctness of the known critical and major tolerance call-outs prior to forming the three-dimensional gage.

19. The method of claim 18 comprising the step of modifying the tolerance call-outs if found syntactically incorrect.

20. The method of claim 16 comprising the step of calibrating the position measuring apparatus.

21. The method of inspecting a fabricated structural part having known critical and major dimensional features and tolerance call-outs in accordance with a known geometric dimensioning and tolerancing standard, utilizing a computer coupled to a display, and a three-dimensionally movable member carrying a position measuring apparatus operating to determine the positions of structural features on the fabricated part, comprising the steps of obtaining the critical and major dimensions and tolerances of the part, displaying a model of the part including the critical and major dimensions and tolerances, selecting from the display the known tolerancing standard and the part dimensions to which the known standard pertains, forming data representative of a three-dimensional gage represented by the selected tolerancing standard and part dimensions, generating an inspection path for inspection of the selected part dimensions, instructing the three-dimensionally movable member to follow the inspection path, measuring the position of the fabricated part features embodied by the selected part dimensions as the movable member follows the inspection path, forming data representative of a three-dimensional model of the measured fabricated part features, determining if the gage fits the fabricated part model, reworking the fabricated part model within the tolerances if the gage does not fit, and indicating that the fabricated part is reworkable if the gage fits the reworked model and that the fabricated part is scrap if it does not.

22. Apparatus for comparing a three-dimensional model of an inspection gage to a three-dimensional model of a manufactured part using computer aided design data for the part, comprising computer means coupled to receive the part design data, display means coupled to said computer for displaying models of the designed part, the inspection gage and the manufactured part, keyboard means coupled to said computer for selecting particular part dimensional and tolerance call-outs on the designed part model display from which selections data descriptive of the inspection gage model is obtained, means for moving a member in three-dimensions coupled to said computer so that an inspection path may be followed around the manufactured part, and a position sensor attached to said moving member and coupled to said computer for detecting the positions of the part features being inspected, so that data descriptive of the manufactured part model is obtained, said inspection gage and manufactured part models being compared visually on the display and mathematically by the computer to determine in and out of tolerance manufactured part conditions.

23. Apparatus as in claim 22 wherein said position sensor comprises a coordinate measuring machine.

24. Apparatus as in claim 22 wherein said position sensor comprises a noncontact inspection system.

25. Apparatus as in claim 22 wherein said position sensor comprises a numerically controlled machine tool and a contact sensor.

26. Apparatus as in claim 22 comprising means for indicating whether the manufactured part is reworkable or scrap if it is determined to be out of tolerance.

27. Apparatus as in claim 22 comprising means for calibrating said position sensor.

28. Apparatus for inspecting a structural part having known dimensional features and tolerance call-outs, comprising
 means for constructing a multidimensional model of an inspection gage using the part dimensional and tolerance call-outs,
 a multidimensionally movable position measuring apparatus for determining the positions of structural features on the part,
 means for generating an inspection path relative to the part defining movement of the position measuring apparatus,
 means for moving the position measuring apparatus along the inspection path,
 means for constructing a multidimensional model of the structural part using the determined positions of the structural features, and
 means for comparing the inspection gage model with the structural part model for determining if the part is within or out of tolerance from the comparison features data within the stipulated part tolerances, and
 determining whether the reworked data represents a part within tolerances.

29. The apparatus of claim 28 comprising means for indicating if the part is reworkable or scrap when it is determined to be out of tolerance.

30. A method of inspecting a manufactured structural part to determine conformance to known dimensional features and tolerance call-outs using a computer coupled to a multidimensionally movable position measuring apparatus comprising the steps of
 ascertaining syntactic correctness of the tolerance call-outs required for structural part definition,
 modifying the tolerance call-outs to assume syntactic correctness if found to be incorrect,
 constructing a multidimensional model of an inspection gage using the known dimensional features and tolerance call-outs,
 generating an inspection path relative to the manufactured part defining movement of the position measuring apparatus relative to the manufactured part,
 moving the position measuring apparatus along the inspection path,
 determining positions of the structural features on the manufactured part as the position measuring apparatus is moved along the inspection path,
 constructing a multidimensional model of the manufactured structural part using the determined positions of the structural features, and
 comparing the inspection gage model with the structural part model for determining if the part is within or out of tolerance from the comparison.

31. The method of claim 30 wherein a display is coupled to the computer, wherein dimensioning and tolerance standards are shown on the display, and wherein the step of constructing a multidimensional model of an inspection gage comprises the steps of
 obtaining data indicative of the known dimensional features and syntactically correct tolerance call-outs,
 displaying a model constructed from the obtained data,
 selecting from the display the dimensioning and tolerancing standard applicable to the data, and
 selecting from the display the design features to which the standard applies, whereby data is obtained indicative of the gage.

32. The method of claim 30 wherein a display is coupled to the computer and wherein the step of generating an inspection path comprises the steps of
 illustrating the inspection path on the display,
 sensing the orientation of the manufactured structural part,
 forming a path program corresponding to the illustrated path, and
 orienting the illustrated inspection path and program to register with the sensed manufactured structural part orientation.

33. The method of claim 30 comprising the step of calibrating the position measuring apparatus.

34. A method of inspecting a structural part having known critical and major dimensional feature and tolerance call-out data in accordance with a known geometric dimensioning and tolerancing standard having defined syntax, utilizing a computer connected to a display, the computer having access to the critical and major dimensional feature and tolerance call-out data for the part, and a three-dimensionally movable member carrying a position measuring apparatus operating to determine the positions of structural features on the part, comprising the steps of
 obtaining the computer accessible critical and major dimensions and tolerances of the part,
 displaying a model of the part including the known critical and major dimensions and tolerances,
 selecting on the display the known tolerancing standard and the part dimensions to which the known standard pertains,
 ascertaining syntactic correctness of the known computer accessible tolerance call-outs as required for structural part definition,
 forming a three-dimensional gage corresponding to the selected tolerancing standard and part dimensions,
 generating an inspection path relative to the structural part for inspection of the selected part dimensions,
 instructing the three-dimensionally movable member to follow the inspection path,
 measuring the position of the part features embodied by the selected part dimensions as the position measuring apparatus is moved along the inspection path,
 forming a three-dimensional model of the measured part features,
 aligning the three-dimensional measured part model with the three-dimensional gage, and
 determining if the gage fits the part model.

35. The method of claim 34 comprising the step of calibrating the position measuring apparatus.

36. A method of inspecting a structural part having known critical and major dimensional features and tolerance call-outs in accordance with a known geometric dimensioning and tolerancing standard having defined syntax, a computer coupled to a display, and a three-dimensionally movable member carrying a position measuring apparatus operating to determined the positions of structural features on the part, comprising the steps of
 obtaining the critical and major dimensions and tolerances of the part,
 displaying a model of the part including the known critical and major dimensions and tolerances, selecting on the display the known tolerancing standard and the part dimensions to which the known standard pertains, ascertaining syntactic correctness of the known tolerance call-outs as required for structural part definition, forming a three-dimensional gage represented by the selected tolerancing standard and part dimensions, generating an inspection path relative to the structural part for inspection of the selected part dimensions, instructing the three-dimensionally movable member to follow the inspection path, measuring the position of the part features embodied by the selected part dimensions as the position measuring apparatus is moved along the inspection path, forming a three-dimensional model of the measured part features, aligning the three-dimensional measured part model with the three-dimensional gage, determining if the gage fits the part model, comprising steps of reworking the part model within the tolerances if the gage does not fit, and indicating that the part is reworkable if the gage fits the reworked part model and that the part is scrap if it does not.

37. A method of predetermining a job sequence to be performed on a part by a system including a computer coupled to a multidimensionally movable position measuring apparatus, a store coupled to the computer containing a stored CAD model of the part to be subjected to the job sequence, and a machine for performing operations on the part, the machine being adapted to be attached to and governed by the system, comprising the steps of informing the system of the identity of the machine, connecting the machine to the system, identifying a point on the CAD model for orientation of the position measuring apparatus and the machine, designating the sequence of operations by the machine and the position measuring apparatus, analyzing the data obtained from operations involving the position measuring apparatus, and disconnecting the machine.

38. The method of claim 37 comprising the step of calibrating the position measuring apparatus.

39. The method of claim 37 wherein the system contains a display, comprising the step of simulating the steps of informing, connecting, identifying, designating, analyzing and disconnecting for observation on the display.

40. A method of analyzing data relating to a physical part resulting from the operation of a system including a computer coupled to a multidimensionally movable position measuring apparatus and a machine governed by the system, and a store coupled to the computer containing CAD data relative to a part to be subjected to the analysis and data received relative to the physical configuration of the part, comprising the steps of constructing data representative of an inspection gage for features on the part by retrieving CAD data relative to such features, measuring the corresponding physical features of the part, storing data relating to the part physical features, and determining the fit between the gage and the measured part data.

41. The method of claim 40, comprising the steps of reworking the stored measured physical features data within the stipulated part tolerances, and determining whether the reworked data represents a part within tolerances.

42. The method of claim 41, comprising the step of indicating that the part is scrap if the determination is that the reworked part is not within tolerances.

43. The method of claim 40 comprising the steps of storing a plurality of physical feature data for like features measured on a plurality of parts, and determining if the machine is making the part features the same as in the past.

44. The method of claim 43 comprising the steps of indicating an out of control condition when the determination is that the part features are not being made the same as in the past, and investigating the cause of the out of control condition.

45. The method of claim 44 comprising the steps of correcting the cause of the out of control condition, making a limited run of the parts, and determining if the machine is making parts features the same as in the past.

46. The method of claim 43 comprising the step of continuously updating the store of physical feature data for like part features.

47. A system for inspecting a structural part coupled to computer aided design data for the part, comprising means for reading the dimensions and tolerances from the computer aided design data for the part features to be inspected, means for mathematically constructing a three-dimensional inspection gage for the part utilizing the dimensions and tolerances, means for measuring the part features to be inspected and for providing inspection data representative thereof, means for mathematically constructing a three-dimensional model of the inspected part features, and means for comparing the three-dimensional model with the three-dimensional gage, whereby compliance with design data tolerances is determined.

48. The system of claim 47 wherein said means for comparing, comprises means for displaying said three-dimensional model and said three-dimensional inspection gage simultaneously in distinguishable form, whereby compliance with design data tolerance is visually obtained.

49. The system of claim 47 wherein said means for comparing comprises means for displaying compliance with design data tolerance in tabular form.

50. The system of claim 47 wherein said means for measuring comprises means for moving a measuring member about the structural part, and means for constructing an inspection path for said measuring member to travel between the part features to be inspected.

51. The system of claim 50 comprising means for constructing a three-dimensional model of the part utilizing the computer aided design data, and means for displaying said inspection path and the part features to be inspected superimposed on said three-dimensional model of the part.

52. The system of claim 47 comprising means for determining tolerance syntax propriety utilizing the dimensions and tolerances.

53. The system of claim 47 comprising means for continuously storing inspection data for a population of structural parts, and means for statistically analyzing each part feature measurement to determine if the part manufacturing process is exercising acceptable control.

54. The system of claim 47 comprising means for determining tolerances for specified part features to be added to the description of the structural part.

55. The system of claim 47 wherein computer aided design data is available for a mating part to the structural part, comprising means for analyzing the worst case mating part and structural part tolerances to determine if in tolerance interference may exist, and means for displaying the analysis results.

56. The system of claim 47 wherein the system is capable of being connected to any one of a variety of machines for performing a job, comprising
means for identifying the machine to which the system will be attached to perform the job,
means for prompting a system operator during definition of the job to be executed,
means for defining the orientation of the structural part to be subjected to the job process,
means for entering the definition of any job make and inspect operations into the system, and
means for analyzing part feature measurements for determining job control effectivity.

57. The system of claim 56 wherein said means for analyzing comprises means for statistically inspecting part feature measurements from a population of structural parts to determine if the parts are being made as they were made in the past.

58. The system of claim 56 wherein the means for analyzing comprises means for determining if the structural part is reworkable if the means for comparing indicates noncompliance with the design data tolerances.

59. The system of claim 56 comprising means for simulating execution of a deferred job.

60. A computer controlled display system for inspection and analysis of predetermined part features on a structural part coupled to computer aided design and tolerance data for the structural part, comprising
a display surface,
means for simultaneously displaying a design data model of the structural part and an inspection path about the part model for the predetermined part features, and
means for selectivity altering said inspection path on said display surface.

61. A computer controlled display system for inspection and analysis of part features on a structural part coupled to computer aided design and tolerance data describing the structural part and to measuring means for the part features, comprising
a display surface,
means for selecting the part features for inspection and analysis, and
means for simultaneously displaying a model of the selected structural part features and an overlaid model of an inspection gage constructed from computer aided design and tolerance data relevant to the selected part features.

62. A computer controlled display system as in claim 61 wherein said means for simultaneously displaying comprises means for simultaneously displaying inspection results.

63. A computer controlled display system as in claim 62 wherein said means for simultaneously displaying inspection results comprises means for displaying said inspection results in tabular form.

64. A computer controlled display as in claim 62 comprising means for displaying a statistical analysis of said inspection results.

65. A computer controlled display as in claim 62 comprising means for presenting rework instructions based on said inspection results.

66. A computer controlled display as in claim 61 wherein said means for simultaneously displaying comprises means for displaying said models in distinguishable colors.

67. A method of investigating compatability of predetermined standard dimensioning and tolerance call-outs on mating parts utilizing a computer, wherein design and tolerance data for the mating parts is available to the computer in memory, comprising the steps of
retrieving the design and tolerance data relating to the mating parts from the memory,
consulting the rules governing the predetermined standard tolerance call-outs to obtain proper tolerance interpretation for the retrieved data
applying the interpreted tolerance call-outs to the mating design data,
computing the worst case tolerance conditions for material interference between mating parts, and
displaying the results of the worst case tolerance condition computation.

68. The method of claim 67 wherein the tolerance data include datums on each of the mating parts, comprising the steps of
determining if there is inconsistency in the datum call-outs in the tolerance data for the mating parts, and
indicating alternatively no inconsistency if there is none and a location of such inconsistency if some exists.

69. A method of investigating compatibility of tolerance call-outs on mating parts using a computer having access to memory containing design and tolerance data, including dimension and tolerance datums, for the mating parts, comprising the steps of
retrieving the design and tolerance data from the memory relating to the mating features on the mating parts,
determining if there is inconsistency in the datum call-outs in the tolerance data for the mating parts, and displaying alternatively an indication of no inconsistency where none exists and the location and nature of an inconsistency where some exists.

70. The method of claim 69 comprising the steps of
computing the worst case tolerance conditions for material interference between mating parts, and
displaying the results of the worst case tolerance condition computation.

71. A method of determining tolerance call-outs for fixed and floating fastener features on mating parts wherein design data for the mating parts is available in memory, comprising the steps of
selecting a fastener,
designating the position on a part where the fastener is to be used,
designating the datums on the part to which the fastener location is to be referenced, selecting a tool for forming the part features to receive the fastener, determining the part feature maximum and minimum sizes for accommodating the fastener considering the tool and the selected fastener, and displaying the true position tolerance for the fastener accommodation part features.

72. The method of claim 71 wherein the fastener is a floating fastener and the step of displaying comprises the step of showing a true position tolerance zone of zero at maximum material conditions.

73. The method of claim 71 wherein the fastener is a fixed fastener and wherein the part feature in a floating part is a clearance hole comprising the steps of determining the thickness of the floating part, and reducing the size of the clearance hole tolerance in accordance with such thickness.

* * * * *

UNITED STATES PATENT AND TRADEMARK OFFICE
CERTIFICATE OF CORRECTION

PATENT NO. : 4,918,627

DATED : April 17, 1990

INVENTOR(S) : Christopher R. Garcia, et al

It is certified that error appears in the above-identified patent and that said Letters Patent is hereby corrected as shown below:

On title page, item [73], add inventors: --David V. Grillot, Palo Alto;

Thomas W. Pastursak, San Jose;--.

Signed and Sealed this

Ninth Day of March, 1993

*Attest:*

STEPHEN G. KUNIN

*Attesting Officer*    Acting Commissioner of Patents and Trademarks